(12) United States Patent
Groot et al.

(10) Patent No.: US 7,431,164 B2
(45) Date of Patent: Oct. 7, 2008

(54) DEVICE AND METHOD FOR SORTING PRODUCTS

(75) Inventors: Frits Franciscus Carolus Groot, Boxtel (NL); Gregorius Maria Adrianus Van Vught, Eindhoven (NL); Cornelis Christiaan Goelema, Eindhoven (NL); Jacobus Marie Van Den Goor, Nuenen (NL)

(73) Assignee: Vanderlande Industries Nederland B.V., Veghel (NL)

( * ) Notice: Subject to any disclaimer, the term of this patent is extended or adjusted under 35 U.S.C. 154(b) by 211 days.

(21) Appl. No.: 10/777,757

(22) Filed: Feb. 13, 2004

(65) Prior Publication Data

US 2004/0232056 A1    Nov. 25, 2004

(30) Foreign Application Priority Data

Feb. 14, 2003    (NL) .................................... 1022682

(51) Int. Cl.
*B07C 9/00* (2006.01)
*B65G 47/10* (2006.01)
*B65G 47/46* (2006.01)

(52) U.S. Cl. .................. 209/698; 209/707; 198/370.04; 198/621.3; 198/852

(58) Field of Classification Search ............ 198/370.04, 198/370.01, 370.05, 377.02, 377.06, 377.1, 198/621.3, 370.03, 831, 852, 321; 209/268, 209/900, 698, 707, 923
See application file for complete search history.

(56) References Cited

U.S. PATENT DOCUMENTS

| | | | | |
|---|---|---|---|---|
| 4,635,785 A | * | 1/1987 | Prydtz | 198/370.04 |
| 4,846,335 A | * | 7/1989 | Hartlepp | 198/370.04 |
| 5,667,054 A | * | 9/1997 | van den Goor | 198/370.04 |
| 5,857,555 A | * | 1/1999 | Maier et al. | 198/370.04 |
| 6,135,262 A | * | 10/2000 | Polling | 198/370.04 |
| 6,152,280 A | * | 11/2000 | Bruun | 198/370.04 |
| 6,193,074 B1 | * | 2/2001 | Baum et al. | 209/606 |
| 6,712,194 B1 | * | 3/2004 | Abildgaard et al. | 198/370.04 |
| 6,874,614 B2 | * | 4/2005 | Heitplatz | 198/370.04 |

FOREIGN PATENT DOCUMENTS

| | | |
|---|---|---|
| EP | 0 869 086 | 10/1998 |
| WO | WO 99/33719 | 7/1999 |
| WO | WO 00/02802 | 1/2000 |

* cited by examiner

*Primary Examiner*—Patrick Mackey
*Assistant Examiner*—Mark Hageman
(74) *Attorney, Agent, or Firm*—Oblon, Spivak, McClelland, Maier & Neustadt, P.C.

(57) ABSTRACT

The invention relates to a device for sorting products, which device comprises adjacently arranged supporting units which are movable in a direction of transport along a conveying path, each supporting unit being provided with at least one load carrying platform comprising a supporting surface for supporting a product. The load carrying platform is supported by a support member, which can be tilted by tilting means about an axis of tilt parallel to the conveying path with respect to a conveying element forming part of a supporting unit, which conveying element is movable along a guide extending according to said conveying path. The tilting means comprise at least one cam which can be rotated by drive means about an axis of rotation extending parallel to the axis of tilt, spaced from said cam by some distance, during which rotation the cam moves over a camway so as to cause the support member to tilt about the axis of tilt, between a neutral position and an extreme position, through rotation of the cam about the axis of rotation.

32 Claims, 19 Drawing Sheets

31

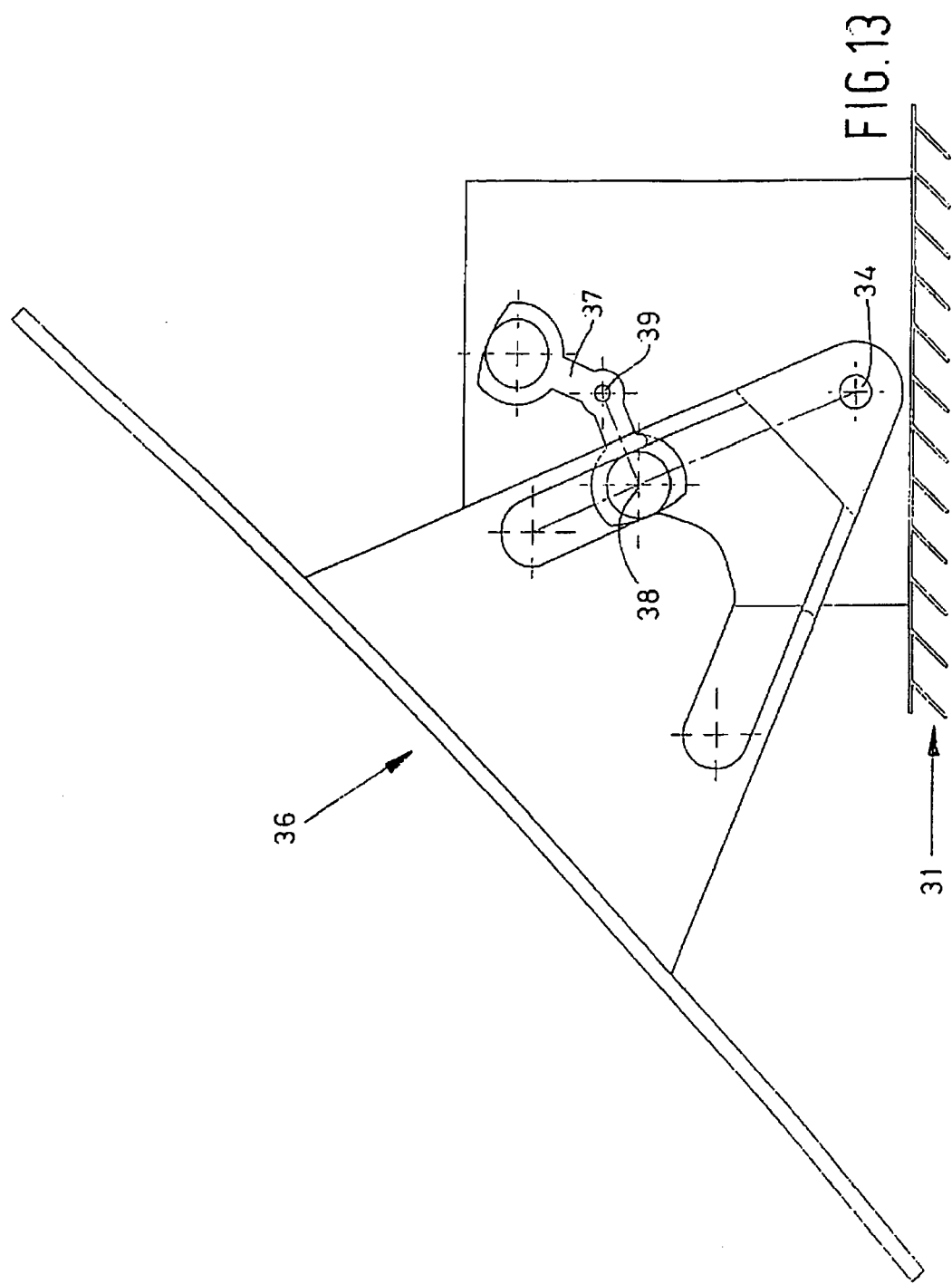

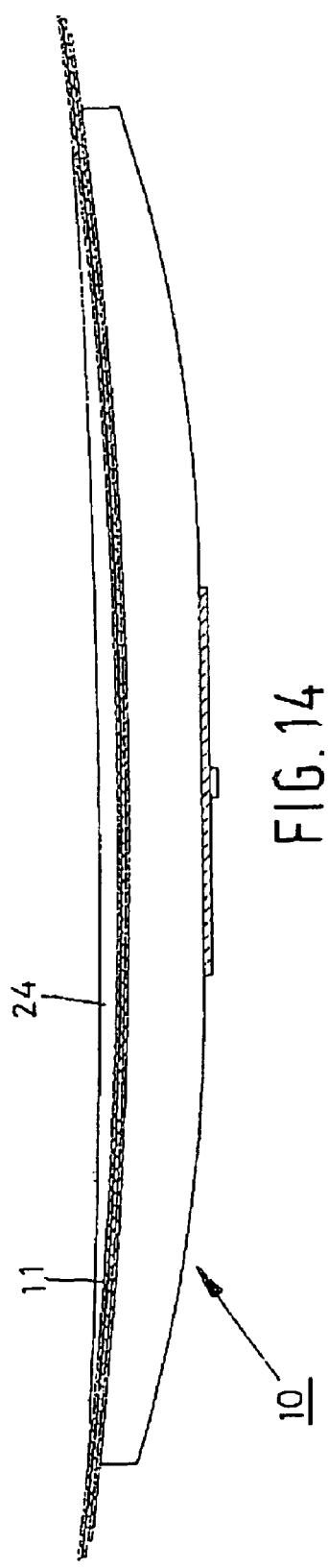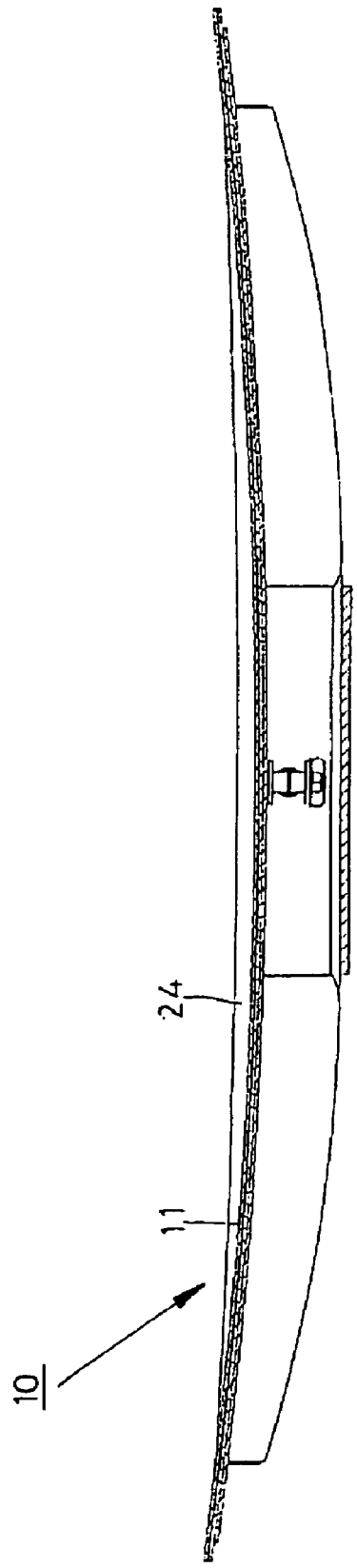

DEVICE AND METHOD FOR SORTING PRODUCTS

DESCRIPTION

The invention relates to a device for sorting products, which device comprises adjacently arranged supporting units which are movable in a direction of transport along a conveying path, each supporting unit being provided with at least one load carrying platform comprising a supporting surface for supporting a product, which load carrying platform is supported by a support member, which can be tilted by tilting means about an axis of tilt parallel to the conveying path with respect to a conveying element forming part of a supporting unit, which conveying element is movable along a guide extending according to said conveying path.

It is known to use an electric motor for each supporting unit for effecting tilting movement of a load carrying platform. In this connection reference may be made to the content of International patent application WO 00/71446 A1. The sorting device that is described in said patent application comprises a support member provided with a non-linear path formed as a groove, within which a smooth rotary wheel to be driven about its own axis by an electric motor extends, on which the upper side of the groove rests. Rotation of said wheel causes the support member to tilt about an axis, the position of which axis changes in vertical direction during said tilting movement, depending on the shape of said non-linear path.

The drawback of such a method of providing the required tilting movement is that there is little mechanical resistance against undesirable tilting of the support member from the neutral position, wherein the mechanical resistance, if any, must be provided by the electric motor. In addition to being subjected to this load, the electric motor is also subjected to a relatively heavy load during desired tilting of the support member on account of the limited diameter of the rotary wheel. Consequently, the electric motor must be of relatively heavy construction.

The object of the invention is to realise an improvement, whether or not in preferred embodiments thereof, as regards the drawbacks of the prior art as described above. In order to accomplish that object, the sorting device according to the invention is in the first place characterized in that the tilting means comprise at least one cam which can be rotated by drive means about an axis of rotation extending parallel to the axis of tilt, spaced from said cam by some distance, during which rotation the cam moves over a camway so as to cause the support member to tilt about the axis of tilt, between a neutral position and an extreme position, through rotation of the cam about the axis of rotation. The use of a cam as described above makes it possible to load the drive means to the least possible extent during rotation about the axis of rotation.

Preferably, the camway forms part of the support member, since this enables a simple and stable construction. This preferred embodiment also includes sorting devices in which the camway is fixed to the support member, so that movement of the support member and the camway relative to each other is not possible, only joint movement is possible.

Preferably, said camway extends at least substantially in radial direction with respect to the axis of tilt, as a result of which it is possible in principle to use a camway of simple design.

Furthermore preferably, the connecting lines between the axis of rotation and the cam on the one hand and between the axis of tilt and the cam on the other hand include an angle ranging between 60 degrees and 120 degrees, more preferably between 80 degrees and 100 degrees, with each other in the neutral position. Thus the mechanical load on the drive means is limited in the neutral position, because forces which might cause undesirable tilting of the support element are not absorbed by the tilting means but by the stop disposed between the cam and the camway. In addition, the starting moment that is to be supplied by the drive means upon commencement of the tilting movement of the support member from the neutral position to an extreme position is limited.

The same kinds of advantages apply if the connecting lines between the axis of rotation and the cam on the one hand and between the axis of tilt and the cam on the other hand include an angle ranging between 60 degrees and 120 degrees, more preferably between 80 degrees and 100 degrees, in an extreme position.

It is furthermore very advantageous if the tilting means are arranged for causing the support member to tilt between the neutral position and the extreme position through rotation through 180 degrees or more of the cam about the axis of rotation. As a result of the relatively large angle of rotation for effecting the tilting movement between the neutral position and the extreme position, the mechanical load on the drive means can be further reduced.

It is noted in this connection that the angle of tilt of the support member between the neutral position and the extreme position preferably ranges between 30 degrees and 60 degrees.

In order to enable tilting movement of the support member in two opposed directions from the neutral position in an advantageous manner, the tilting means preferably comprise two cams which are jointly rotatable about the axis of rotation, during which rotation on one side of the neutral position one of the cams moves over one of the two camways that form part of the support member, and during which rotation on the other side of the neutral position the other one of said cams moves over the other one of the two camways that form part of the support member.

A simple embodiment for achieving this is obtained if the two camways define a V-shape between themselves.

Said V-shape also determines to a considerable extent the manner in which and the extent to which the support member tilts between the neutral position and an extreme position. In order to achieve a tilting range of 30-60 degrees on either side of the neutral position, said V-shape preferably exhibits an angle that ranges between 30 degrees and 60 degrees.

A very suitable driving arrangement is obtained if the drive means comprise an electric motor for each supporting surface. In general, such an electric motor will form part of each supporting unit. The electric power supply thereof may take place by means of a battery, via electric sliding contact or via contactless energy transfer, for example.

In order to prevent products from landing between supporting surfaces associated with adjacent supporting units and getting wedged there, the load carrying platforms of adjacent supporting units preferably abut against each other, each supporting surface being made up of the upper sides of a supporting element and of a bridging element which overlaps the supporting element at a first end thereof and which is movable in a direction parallel to the supporting surface with respect to the supporting element so as to retain the mutual abutment of the adjacent load carrying platforms upon passage through a curved section.

Preferably, each bridging element is movable in two degrees of freedom with respect to the supporting element. The fact that the bridging element according to this preferred embodiment of the invention is movable in two degrees of freedom with respect to the supporting element makes it possible to provide a sorting device of simple construction, in which, in spite of the constructional simplicity, no opening will be formed between two adjacent load carrying platforms upon passage through curved sections either in the horizontal plane or in the vertical plane. Said constructional simplicity is in particular realised if the supporting element abuts with a second end positioned opposite the first end against the bridging element of the adjacent load carrying platform present at the side of said second end. Preferably, said two degrees of freedom concern rotation about an axis of rotation extending perpendicularly to the supporting surface and translation at least substantially in the direction of transport. Said rotation functions to prevent an opening being formed between two adjacent supporting surfaces upon passage through a horizontally curved section, i.e. a section curved in the horizontal plane, whilst said translation prevents such an opening being formed upon passage through a vertically curved section. After all, upon passage through a vertically curved section, the length of the supporting surface needs to increase (a downwardly curved section) or decrease (upwardly curved section). For reasons of constructional simplicity it is furthermore preferable to provide a pivot pin extending perpendicularly to the supporting surface for each combination of a supporting element and a bridging element, which pivot pin is connected to either one of the supporting element and the bridging element and which extends through a slot formed in the other one of said supporting element and said bridging element, or at least in a part of the associated supporting unit that is preferably fixedly connected thereto.

More preferably, spring means are provided for causing adjacent load carrying platforms to abut against each other. Thus it will no longer be necessary for parts of adjacent load carrying platforms to be interconnected somehow in order to have them abut against each other. After all, the spring means are capable of pressing the bridging element against the load carrying platform of an adjacent supporting unit. Preferably, the spring means comprise a tension spring, because of the defined situation that can be achieved therewith as regards the relative positions of the parts between which the tension spring is operative. Alternatively (or in addition thereto), said spring means may also comprise other types of springs, such as leaf springs.

In combination with the pivot pin according to the preferred embodiment as described above, it is furthermore preferable for the spring means to be operative between said pivot pin and the other one of said supporting element and said bridging element, or at least the part of the supporting unit that is connected thereto. It will further contribute to the aimed-at constructional simplicity if the upper side of the supporting element, which forms part of the load carrying platform, is substantially shape-retaining, for example embodied as a fixed plate having rigid circumferential edges.

In order to prevent a product from adhering to a supporting surface, a very special embodiment of the invention is characterized in that the supporting surface is provided with supporting edges extending perpendicularly to the axis of tilt. In this preferred embodiment, the upper sides of said supporting edges in fact support the product. The risk of a product sticking to a supporting surface plays a role in particular in the case of relatively smooth (slightly) moist products, in which the sucking effect may lead to the product sticking to a smooth supporting surface, as it were. An example of such a product are magazines in plastic wrappers. The supporting edges prevent products sticking to the supporting surface, because there is no risk of a vacuum or at least a sub-atmospheric pressure being created between the supporting surface and the product supported by said supporting surface. Thus it can be guaranteed that products are removed from the supporting surface in lateral direction in a reliable manner, as part of a sorting process, as a result of tilting movement of the load carrying platform of which the supporting surface forms part. The use of supporting edges as described above and as will be discussed yet hereinafter on the basis of preferred embodiments of the invention relating to the use of supporting edges can also be used very advantageously with sorting devices according to the prior art, wherein mutual abutment of adjacent load carrying platforms need not even be an object or the use of a cam and a camway is not required. In such a situation, a device for sorting products is provided which comprises adjacently arranged supporting units which are movable in a direction of transport along a conveying path, each supporting unit being provided with at least one load carrying platform, each supporting platform being supported by a support member, which can be tilted by tilting means about an axis of tilt parallel to the conveying path with respect to a conveying element forming part of a supporting unit, which conveying element is movable along a guide extending according to said conveying path, each load carrying platform comprising a supporting surface for supporting a product, which supporting surface is provided with supporting edges extending perpendicularly to the axis of tilt.

In order to make it easier for the products to slide sideways onto the supporting edges on the one hand and, on the other hand, effectively prevent products that are supported (approx.) halfway the length of the supporting edges from sticking to the supporting surface, as it were, as a result of the suction effect, the height of the supporting edges preferably decreases from the centres of said supporting edges towards the ends thereof.

The most advantageous situation is achieved if the height of the supporting edges equals zero at the ends thereof. This preferred embodiment can be excellently combined with a concave main shape of the supporting surface, wherein the upper sides of the supporting edges may be rectilinear in the longitudinal direction thereof.

Said sticking of products to the supporting surface can be effectively prevented in particular if the height of the supporting edges is at least 6 mm, more preferably at least 8 mm, at least halfway the length of said supporting edges.

For the same reason it is furthermore advantageous if the radius of the upper sides of the supporting edges is maximally 8 mm, more preferably maximally 6 mm, at least at a position halfway the length of said supporting edges, as otherwise the area of contact between the upper sides of the supporting edges and the product supported by said supporting edges may become so large that the products will stick to the supporting surface yet.

The advantageous effect of products being prevented from sticking to the supporting surface is in particular obtained if the spacing between two adjacent supporting edges is more than 10 mm. Said spacing must not become too large, however, since this may in turn lead to products landing between adjacent edges. Consequently, the spacing between two adjacent supporting edges is preferably less than 80 mm.

According to a very advantageous preferred embodiment, the length of each supporting surface, seen in the direction of transport, ranges between 500 mm and 700 mm. This enables a modular construction of the sorting device according to the invention. Depending on the field of application, or more specifically on the dimensions of the products to be sorted, it may be decided to take a dimension of approx. 600 mm as the basic length of a supporting surface, or twice said length, viz. approx. 1200 mm, or in extreme cases even more than twice said length of 600 mm. In the latter two cases, tilting of the supporting surfaces jointly forming a basic length will in principle take place simultaneously, although it is also possible, in the case of more intelligent systems, to have the supporting surfaces tilt jointly or individually in dependence on the question whether or not a product is actually being supported by two or more adjacent supporting surfaces. This would make it possible to enhance the capacity utilisation of the sorting device. A basic length of approx. 600 mm would be suitable for handling packages, for example, whilst a basic length of approx. 1200 mm is very suitable for luggage handling systems.

According to an alternative preferred embodiment, the length of each supporting surface, seen in the direction of transport, ranges between 300 mm and 500 mm. Thus it would be possible to use basic lengths of approx. 400 μm, approx. 800 mm, approx. 1200 mm, for example. The first basic length would be suitable in particular for handling small packages, such as magazines and the like. The second basic length would be suitable in particular for use with parcel post services, whilst the third basic length would be suitable in particular for relatively large product, such as luggage at airports. The main advantage of using a relatively small length of an individual supporting surface is the fact that it enables passage through relatively sharply curved sections without the mutual abutment of adjacent load carrying platforms being adversely affected thereby.

Especially in the light of the preceding preferred embodiments, it is preferable for the sorting device to comprise control means which are arranged for simultaneous activation of tilting means associated with at least two adjacent supporting units during joint support of the product by the respective supporting surfaces associated with the support units in question. This preferred embodiment does not exclude the possibility of tilting means being activated individually. The present preferred embodiment, especially in combination with the preceding two preferred embodiments, are also suitable for use in sorting systems according to the prior art providing that there is mutual abutment of adjacent load carrying platforms upon passage through curved sections. Thus, there would be provided a device for sorting products, which device comprises adjacently arranged supporting units which are movable in a direction of transport along a conveying path, each supporting unit being provided with at least one load carrying platform, which abuts against a load carrying platform of an adjacent supporting unit, each load carrying platform being supported by a support member, which can be tilted by tilting means about an axis of tilt parallel to the conveying path with respect to a conveying element forming part of a supporting unit, which conveying element is movable along a guide extending according to said conveying path, each load carrying platform comprising a supporting surface for supporting a product, which supporting surface is made up of the upper sides of a supporting element and of a bridging element which overlaps the supporting element at a first end thereof and which is movable in a direction parallel to the supporting surface with respect to the supporting element so as to retain the mutual abutment of the adjacent load carrying platforms upon passage through a curved section, wherein the sorting device comprises control means which are arranged for simultaneous activation of tilting means associated with at least two adjacent supporting units during joint support of the product by the respective supporting surfaces associated with the support units in question, and wherein the length of each supporting surface, seen in the direction of transport, preferably ranges between 500 mm and 700 mm or between 300 mm and 500 mm.

The invention furthermore relates to a method for sorting products, using a device according to the invention as described above. The advantages of the use of such a method have already been discussed above in the discussion of the device according to the invention.

The invention will now be explained in more detail by means of a description of a number of preferred embodiments of a sorting device according to the invention. In the description, reference is made to the following figures.

Figure 7:
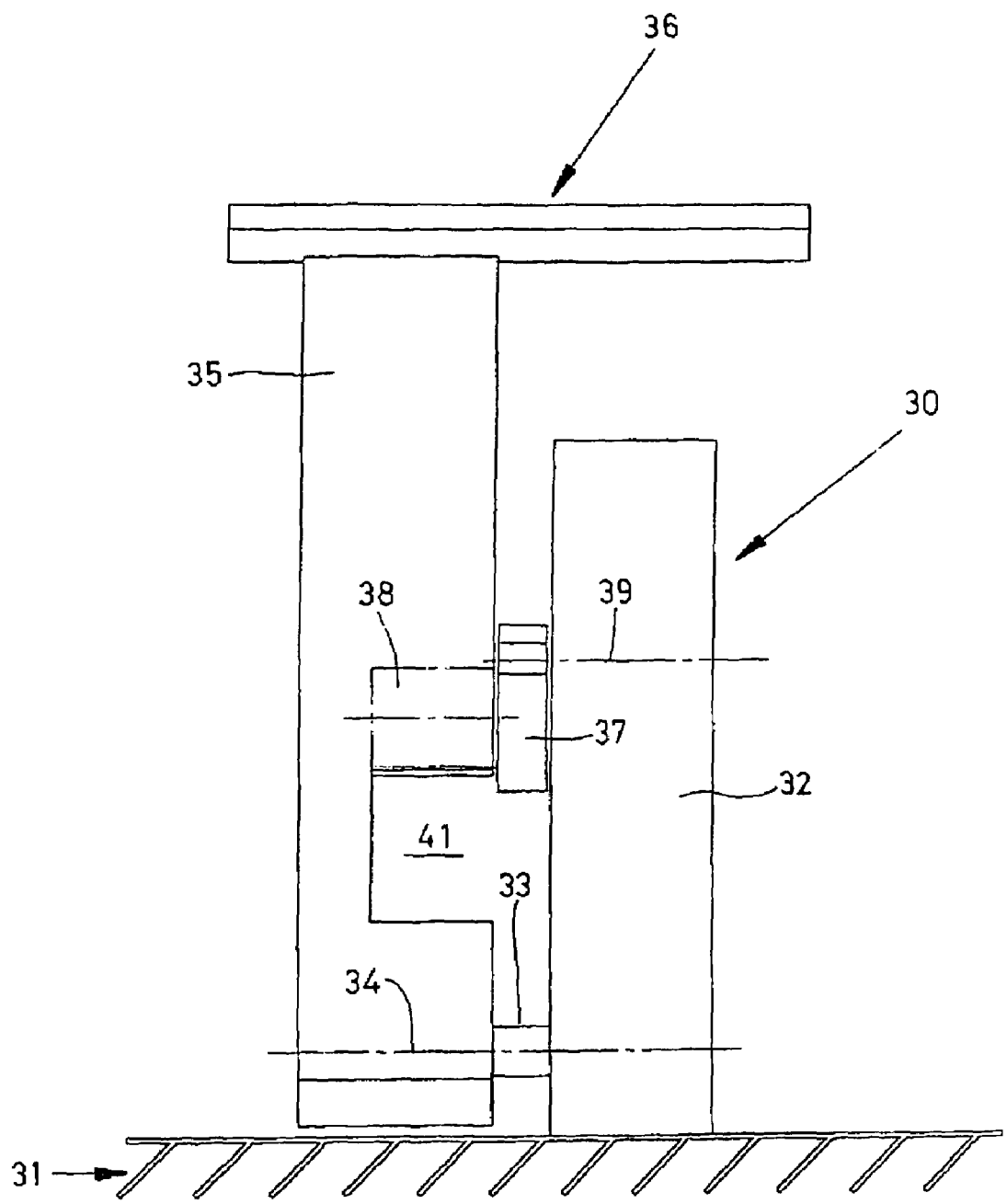

FIG. 7 schematically shows in side elevation a first preferred embodiment of tilting means for a sorting device according to the invention.

FIGS. 8-13 schematically show in front elevation a tilting movement from a neutral position (FIG. 8) to an extreme position (FIG. 13) as effected by the tilting means of FIG. 7.

Figure 4:
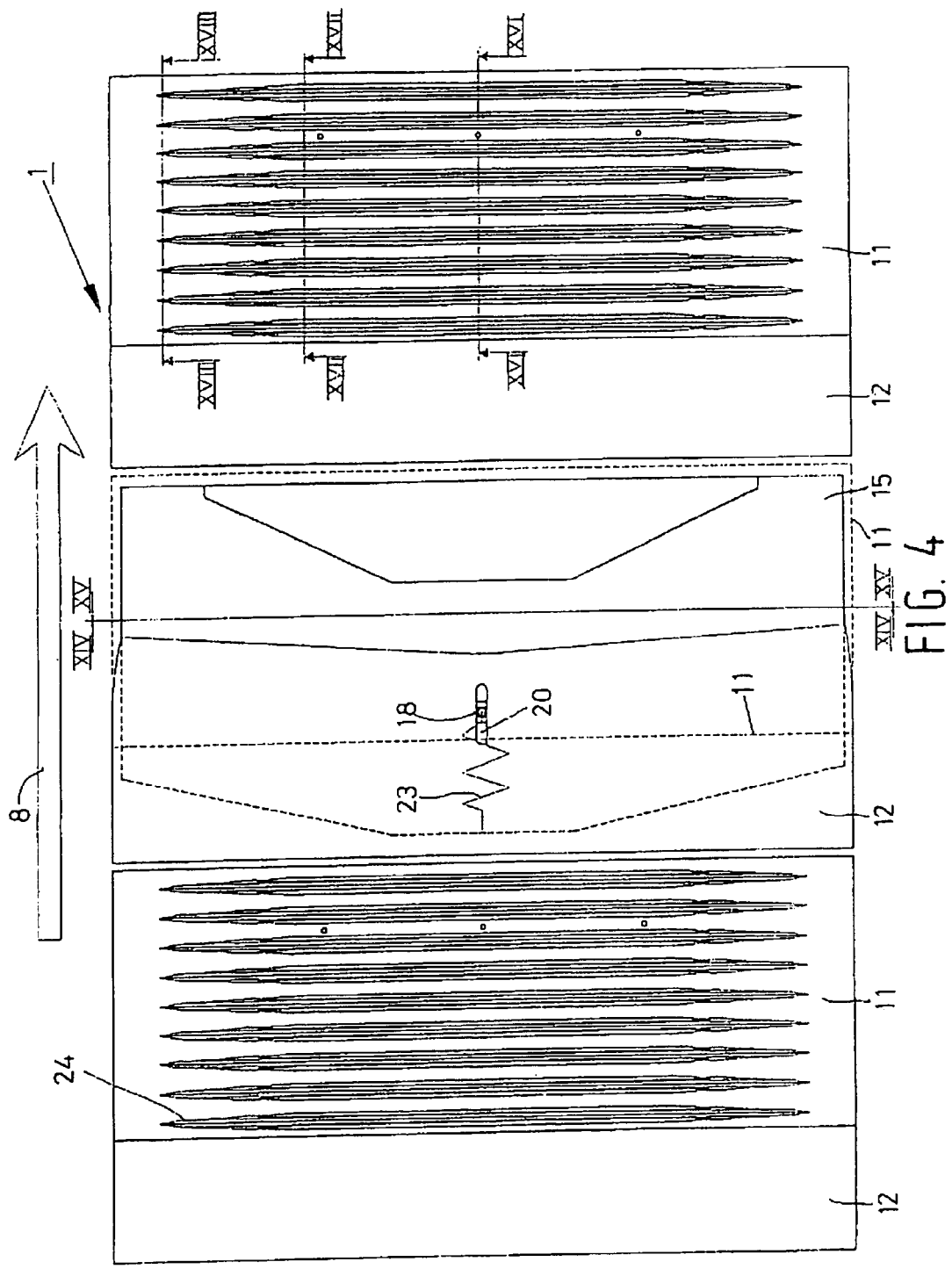
FIG. 4 shows the sorting device of FIG. 1 in schematic top plan view.

FIGS. 14 and 15 are views of a support member along the lines XIV-XIV and XV-XV, respectively, in FIG. 4.

Figure 16:
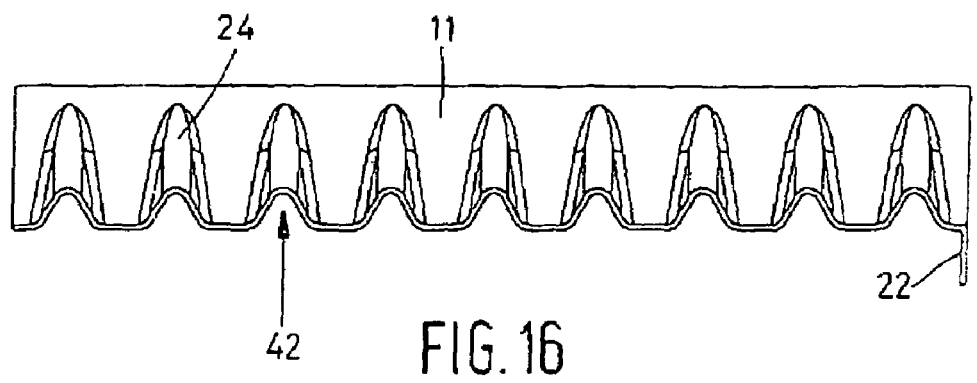
Figure 17:
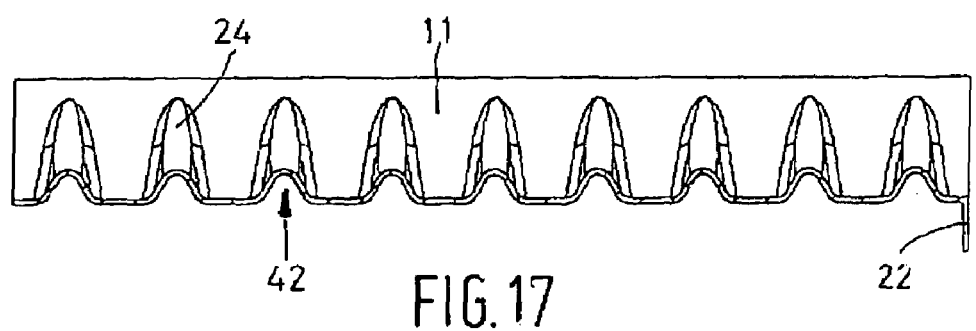
Figure 18:
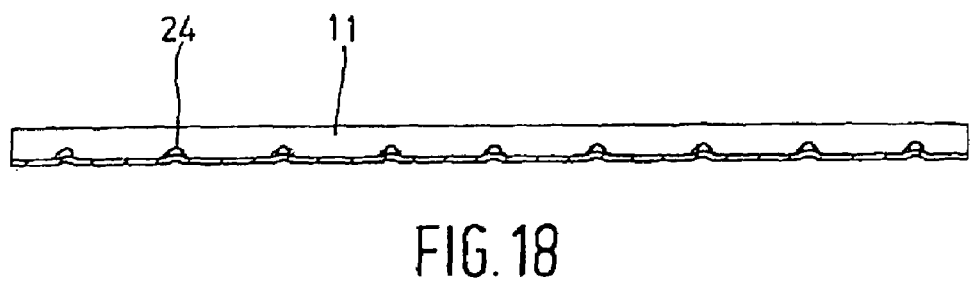

FIGS. 16, 17 and 18 are cross-sectional views along the lines XVI-XVI, XVII-XVII and XVIII-XVIII, respectively, in FIG. 4.

Figure 19:
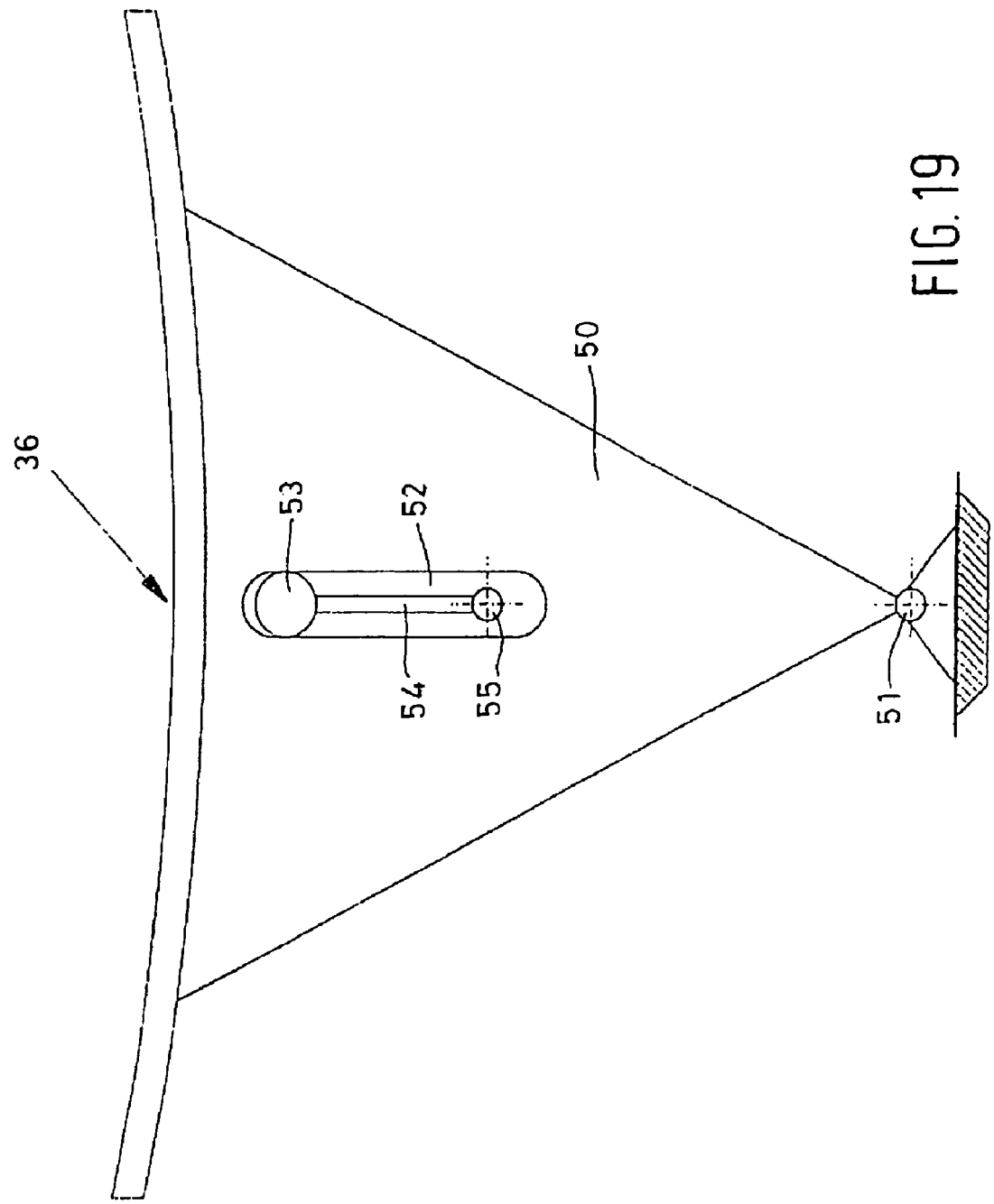
Figure 20:
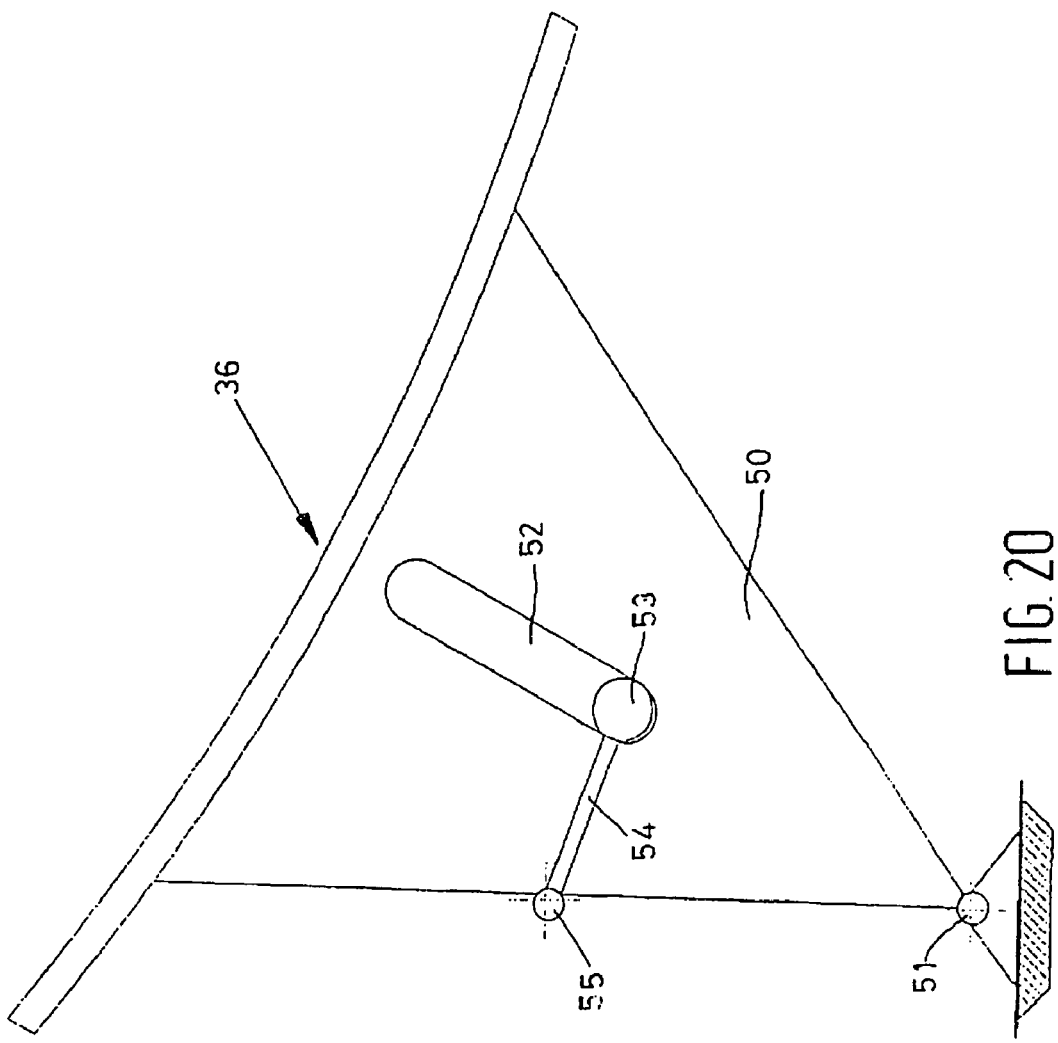

FIGS. 19 and 20 are schematic front views of tilting means according to a second preferred embodiment in a neutral position and an extreme position, respectively.

Figure 21:
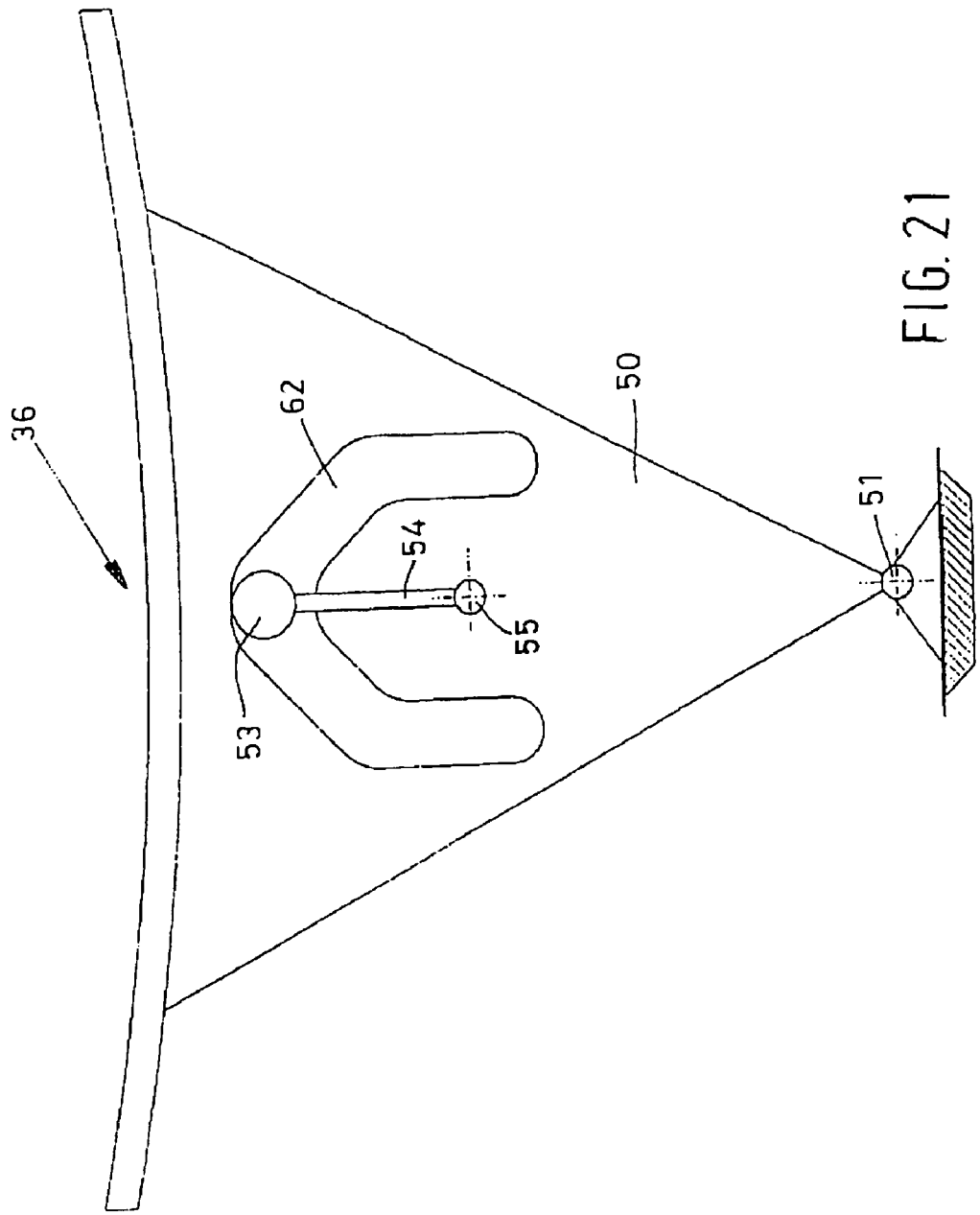
Figure 22:
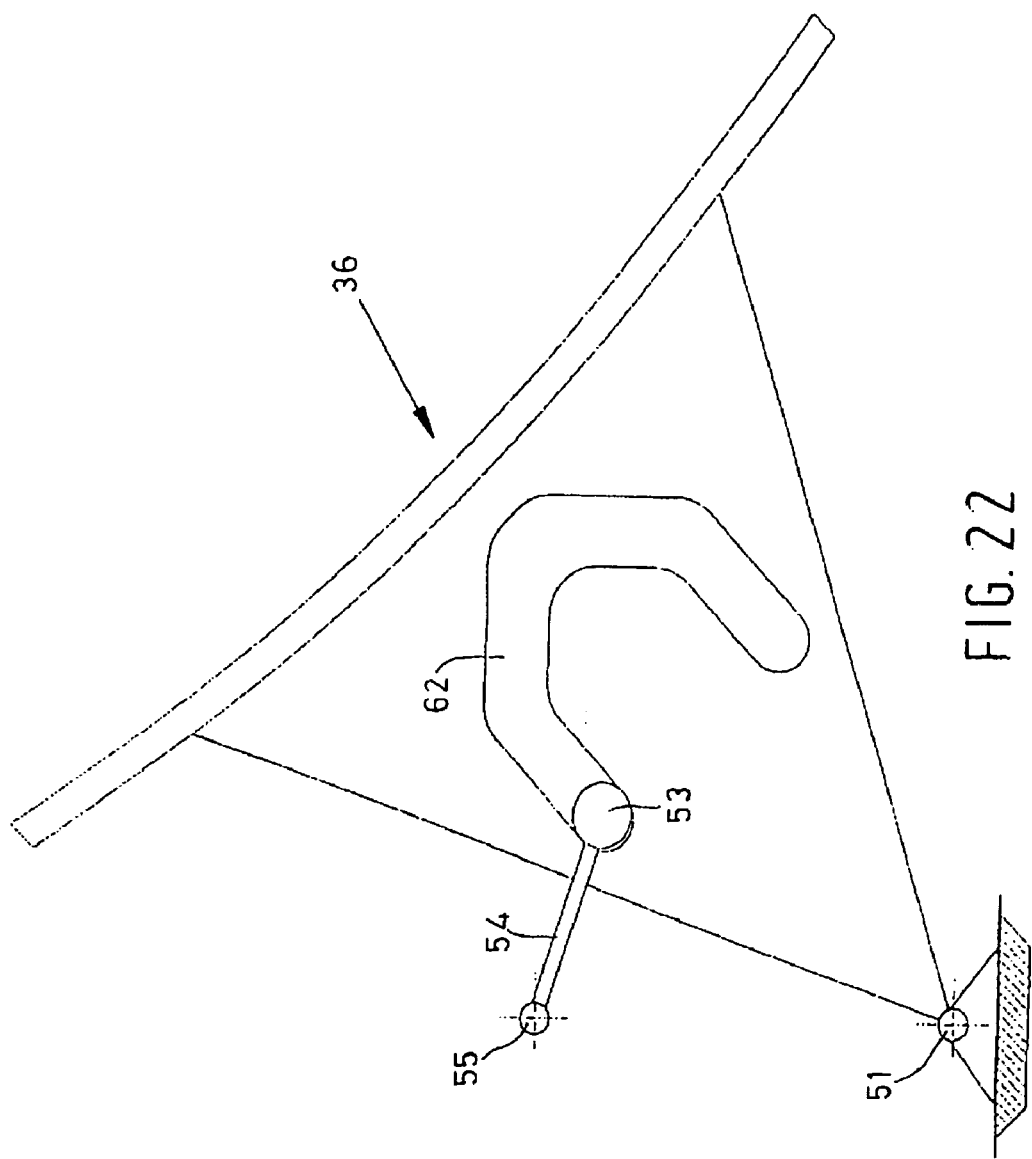

FIGS. 21 and 22 are schematic front views of tilting means according to a second preferred embodiment in a neutral position and an extreme position, respectively.

FIGS. 1-6 show a sorting device 1 according to the invention upon passage through a rectilinear section (FIGS. 1 and 4), an upwardly curved section (FIG. 2), a downwardly curved section (FIG. 3), a section curved to the right (FIG. 5) and a section curved to the left (FIG. 6) of a conveying path. In order to enable passage through all these curved sections, the sorting device 1 comprises a train of trolleys 2 which are coupled by means of coupling/travelling means 3, being pivotable with respect to each other both about a vertical axis (for passing curved sections in the horizontal plane) and about a horizontal axis. Each coupling/travelling means 3 comprises a pair of wheels 4, which are in engagement with rails 5. The course of the rails 5 defines a endless conveying path comprising all the curved sections as described above. Each trolley 2 is fitted with a tilting mechanism 6 for tilting an associated supporting surface 7, which is supported by a supporting body 13, about an axis 9 extending under said supporting surface 7 parallel to the direction of transport 8. The tilting mechanism 6 will be described yet with reference to FIGS. 7-13.

The supporting surface 7 is formed by the upper side of a support member 10, more specifically by a main supporting plate 11 and a bridging/supporting plate 12 thereof. The length of each supporting surface 7, seen in the direction of transport 8, and thus also the pitch between adjacent trolleys 2, is 40 cm. Depending on the field of application and, connected therewith, the dimensions of the products to be sorted, it may be decided to have the supporting surfaces 7 tilt individually or to have two or three (or even more, if necessary) adjacent supporting surfaces tilt simultaneously. If the dimensions of the products to be sorted are so large that said products no longer fit within the circumference of an individual supporting surface 7, it will be decided to have a number of supporting surfaces 7 support the product and tilt simultaneously. In principle it is also possible in this regard to make the number of simultaneously supporting and tilting surfaces 7 dependent on the dimensions of individual products, as a result of which an optimum use is made of the handling capacity of the sorting device. The advantage of the relatively short length of the supporting surfaces 7 is the fact that it is possible in principle to use one design of the sorting device for a large number of fields of application, wherein only the control system associated with the sorting device needs to be geared to the various fields of application. In addition, the relatively short supporting surfaces make it possible to pass through comparatively sharply curved sections, even if a control system is used by means of which two or even three adjacent supporting surfaces 7 supporting one and the same product (for example a piece of luggage) can be tilted simultaneously.

Figure 1:
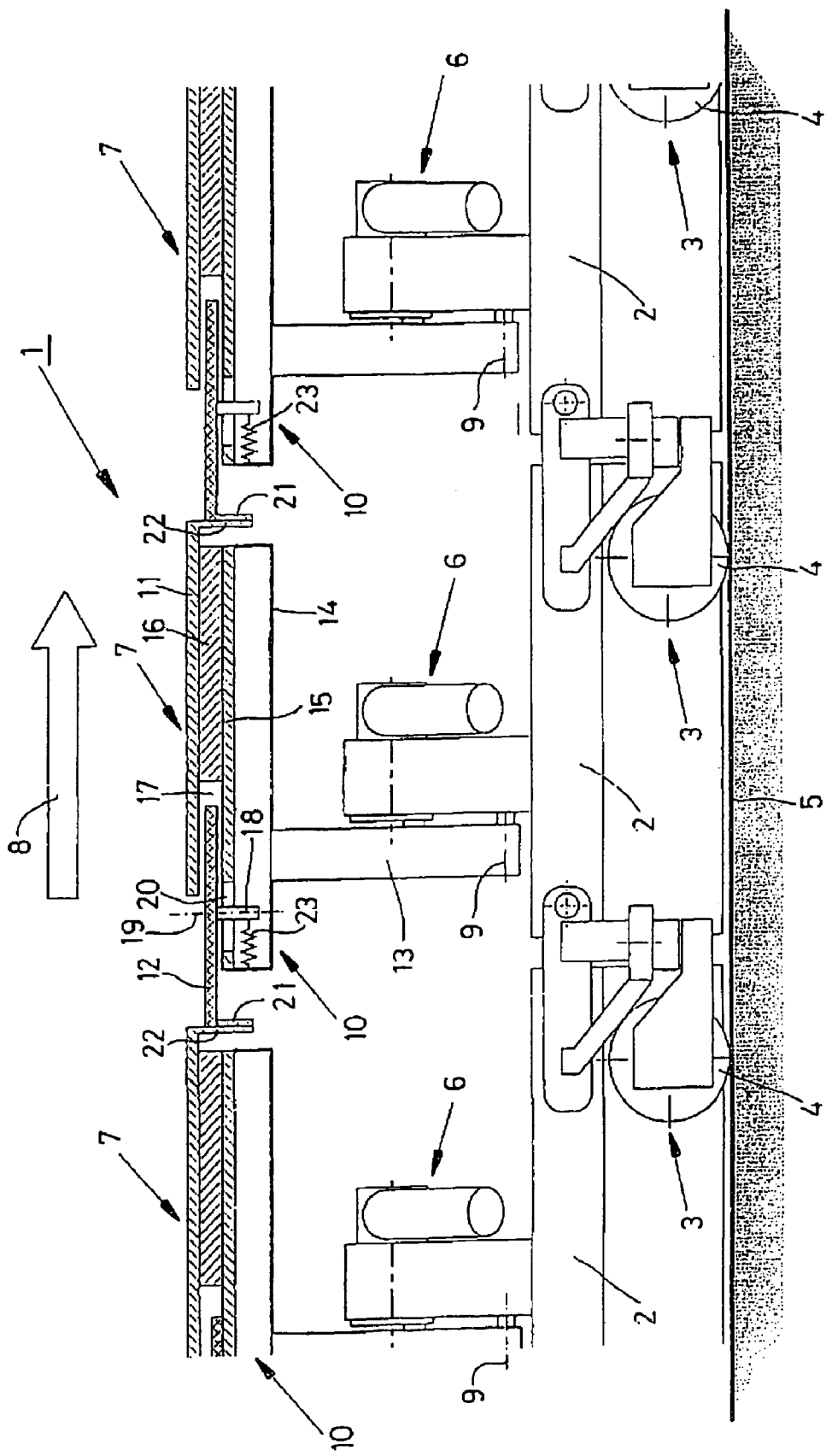
FIG. 1 is a schematic side elevation, partially in cross-section, of a first preferred embodiment of a sorting device according to the invention.

The support member 10 is supported by a supporting body 13, which can be tilted about the axis of tilt 9 by the tilting mechanism 6. In addition to the main supporting plate 11 and the bridging/supporting plate 12 as already mentioned, the support member 10 comprises a box-shaped part 14, a supporting plate 15 and an intermediate plate 16. The box-shaped part 14, the supporting plate 15, the intermediate plate 16 and the main supporting plate 11 are rigidly interconnected, and the assembly thereof is likewise rigidly connected to the supporting body 13. The length of the intermediate plate 16, seen in the plane of drawing of FIGS. 1-3, is shorter than that of the supporting plate 15 and the main supporting plate 11 as a result of which a gap 17 is present between the main supporting plate 11 and the supporting plate 15, within which gap part of the bridging/supporting plate 12 extends, which thus overlaps with the main supporting plate 11 (seen in top plan view).

The bridging/supporting plate 12 is provided with a pivot pin 18 at its bottom side, at a position approx. halfway its length, which enables the bridging/supporting plate 12 to pivot with respect to the main supporting plate 11 about a pivot axis 19 that coincides with the central axis of the pivot pin 18. The pivot pin 18 itself is moreover capable of translating movement, in the direction of transport 8 and in the opposite direction, within a slot 20 formed in the supporting plate 15. Both the main supporting plate 11 and the bridging/supporting plate 12 are provided with downwardly extending cross surfaces 21, 22 at their outward ends. As the various figures show, the outer sides of said cross surfaces 21, 22 abut against the outer sides of the cross surfaces 22, 21, respectively, associated with adjacent support members 10. As a result, the supporting surfaces 7 of the support members 10 jointly form a common supporting surface, which has a closed character as a result of the mutual abutment of the supporting surfaces 7. To that end, a tension spring 23 is operative between the pivot pin 18 and the box-shaped part 14. The action of the tension spring causes the bridging/supporting plate 12 to be pressed outward, so that the cross surface 21 thereof is positioned into abutment with the cross surface 22 of the main the supporting plate 11 of an adjacent support member 10.

The presence of the pivot pin 18 and the fact that it can move through the slot 20 make it possible to retain the abutment of the bridging/supporting plates 12 with the main supporting plates 11 of adjacent support members 10 upon passage through various types of curved sections.

Figure 2:
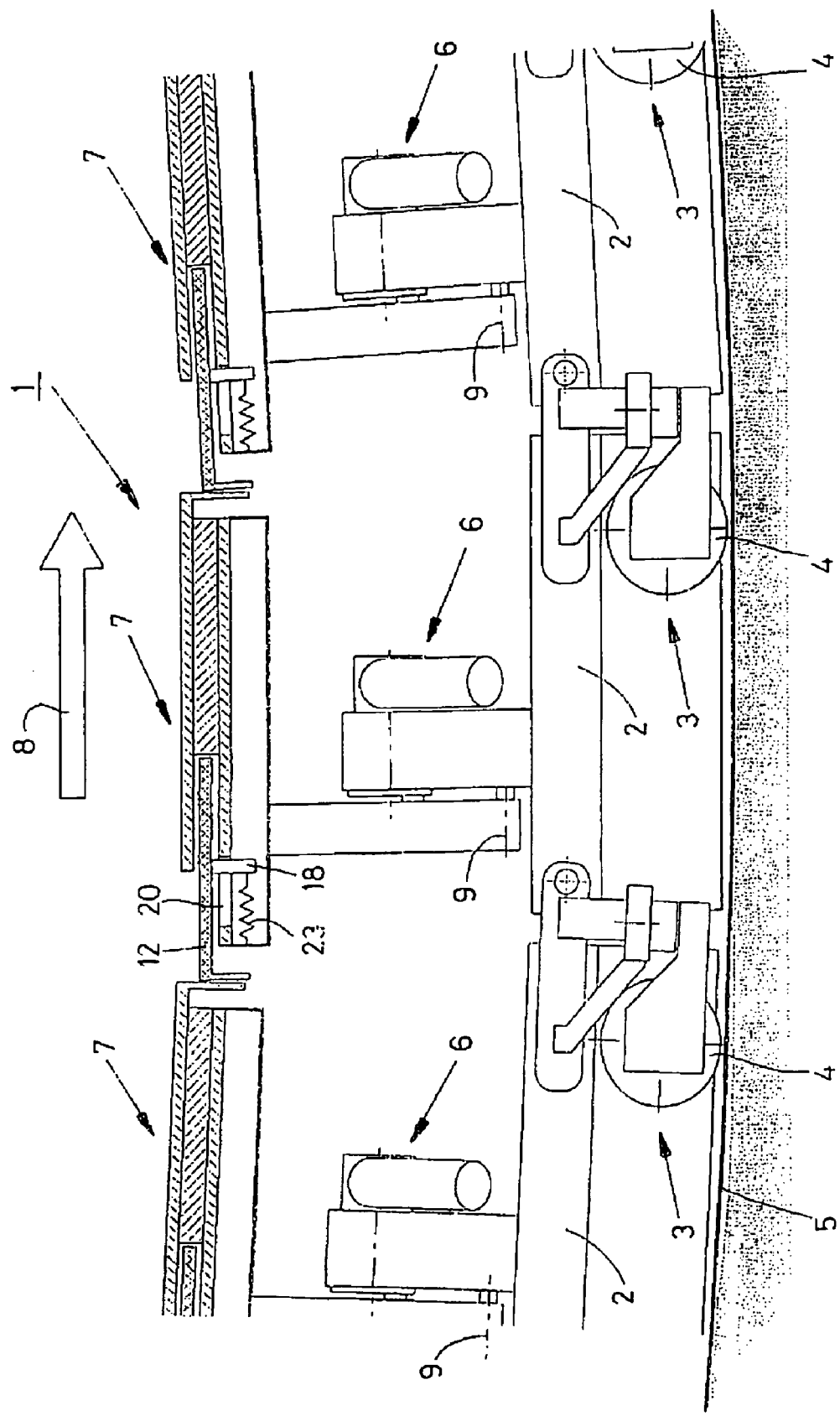
FIG. 2 shows the sorting device of FIG. 1 upon passage through an upwardly curved section.
Figure 3:
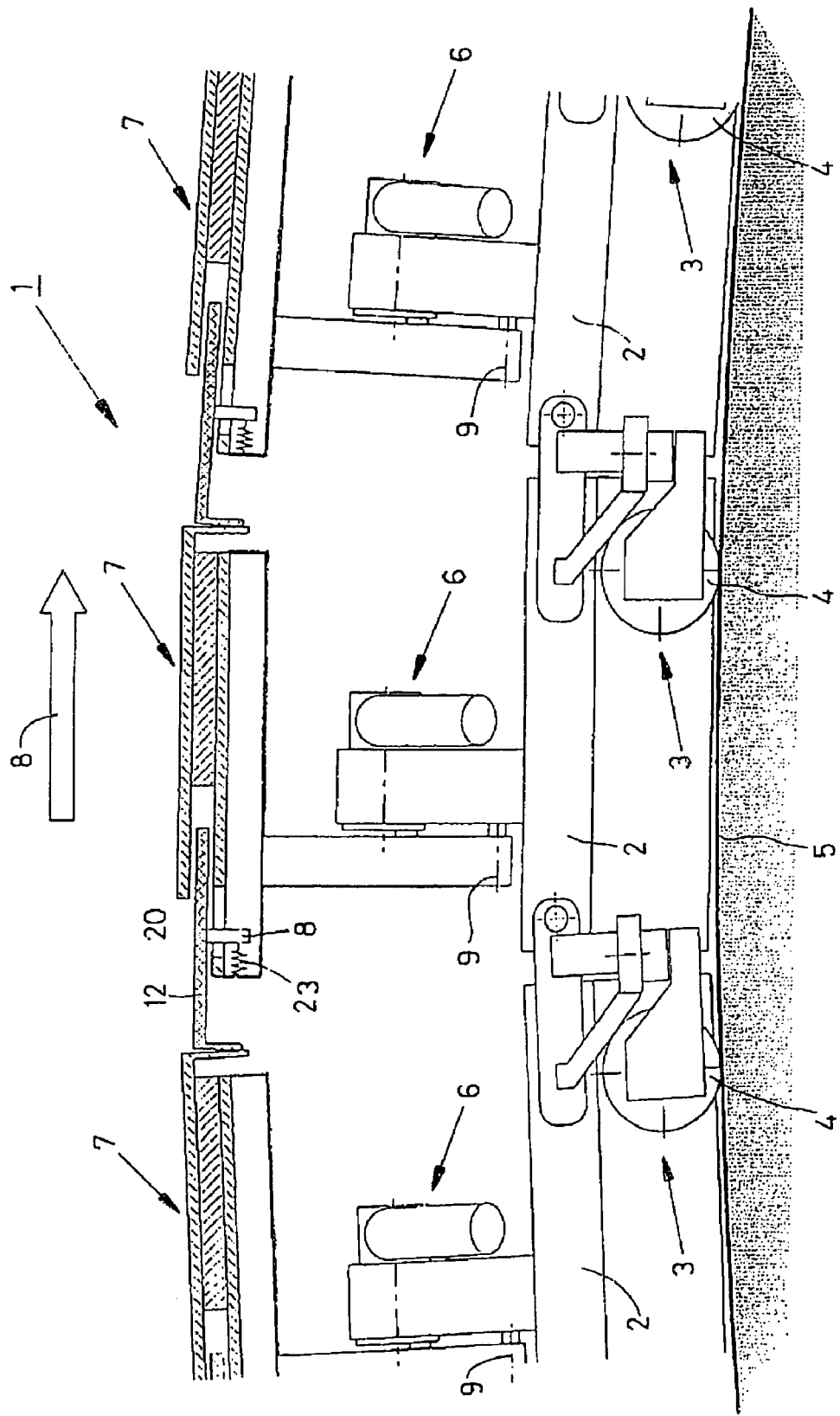
FIG. 3 shows the sorting device of FIG. 1 upon passage through a downwardly curved section.

FIG. 2 shows the passage through an upwardly curved section, as a result of which the available space for the supporting surface 7 between the supporting surfaces 7 of adjacent support members 10 becomes smaller, causing the pivot pin 18 and the bridging/supporting plate 12 to move inwards against the action of the tension spring 23.

In the case of a downwardly curved section, as shown in FIG. 3, exactly the opposite takes place, in that the aforesaid available space for the supporting surface 7 between the supporting surfaces 7 of adjacent support members 10 becomes larger. As a result, the pivot pin 18 and the bridging/supporting plate 12 that is connected therewith pivot outwards rather than inwards, during which pivoting the tension spring 23 remains loaded in tension.

The abutment of the bridging/supporting plate 12 against the main supporting plate 11 of an adjacent support member is maintained both in the case of an upwardly curved section and in the case of a downwardly curved section, therefore.

Figure 5:
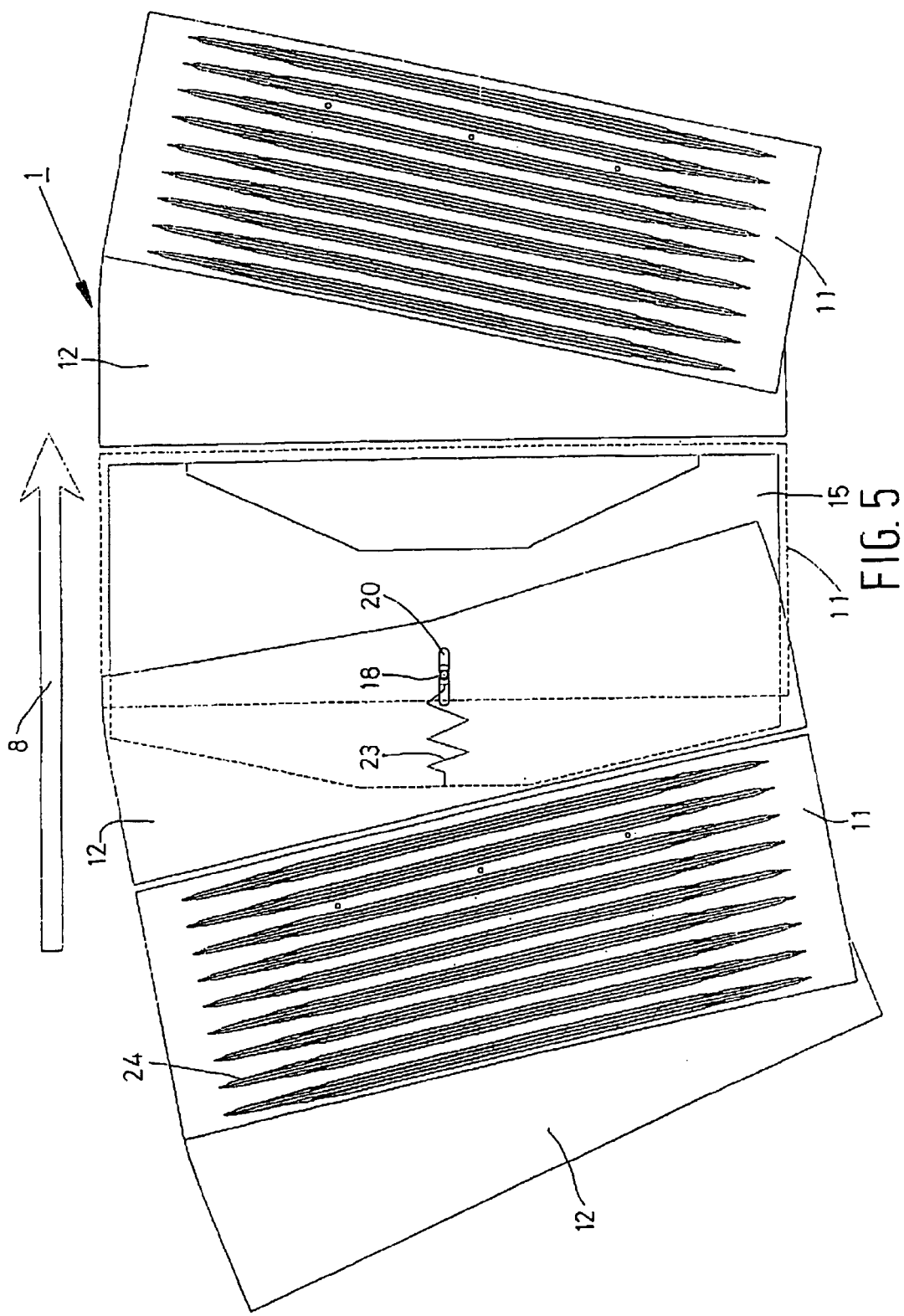
FIG. 5 shows the sorting device of FIG. 4 upon passage through a section curved to the right in the horizontal plane.
Figure 6:
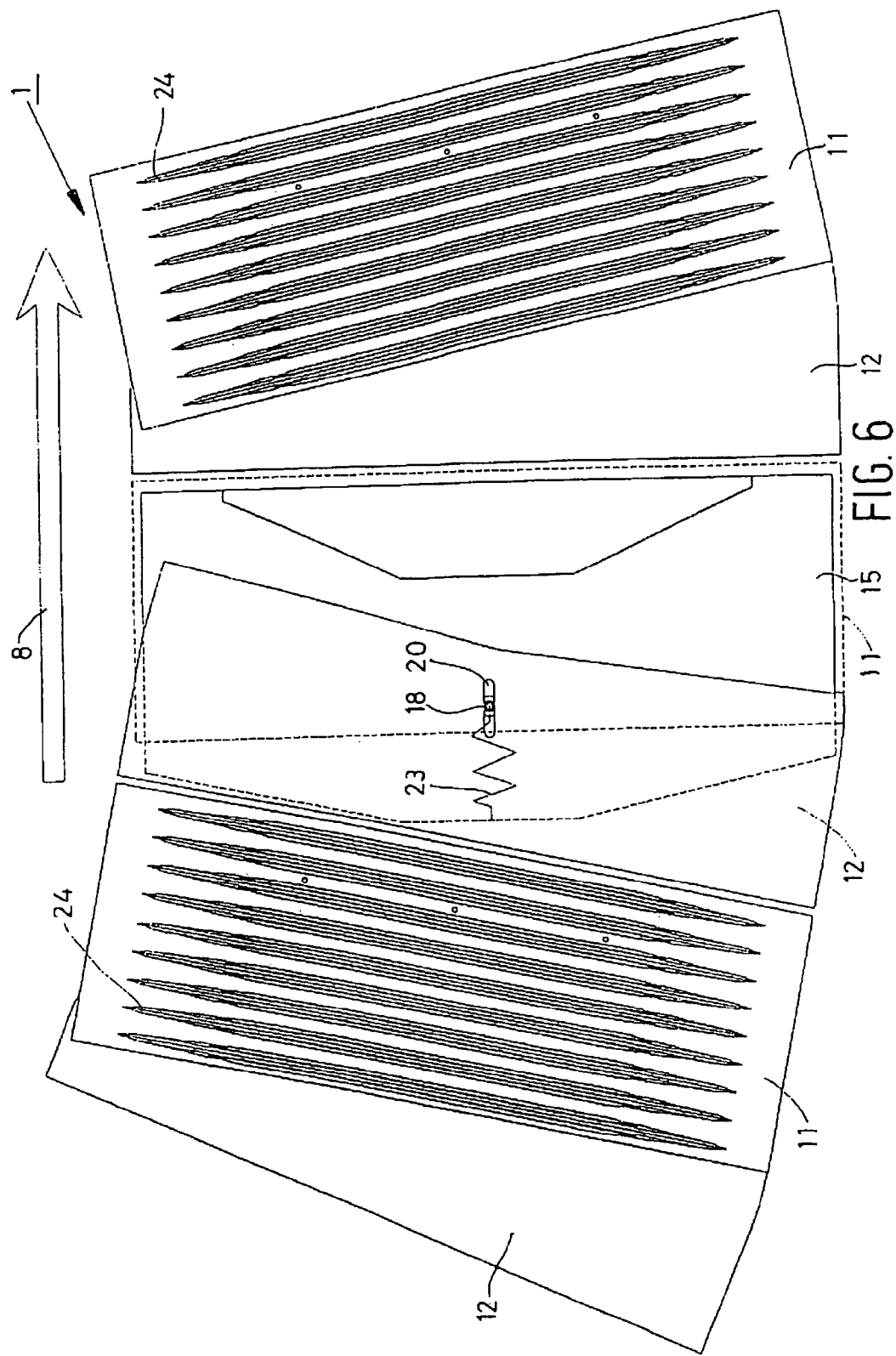
FIG. 6 shows the sorting device of FIG. 4 upon passage of a section curved to the left in the horizontal plane.

The latter is also the case upon passage through a horizontal section curved to the right of the left, as will become apparent from FIGS. 5 and 6, respectively. In FIGS. 4-6 the main supporting plate 11 of the middle support member 10 is represented as being transparent, as it were, for the sake of clarity, and the ridges 24 that are to be discussed yet are not shown. Upon passage through the aforesaid horizontal curved sections, the longitudinal position of the pivot pin 18 in the slot 20 is maintained, but the bridging/supporting plate 12 pivots with respect to the main supporting plate 11. This pivoting movement is imposed precisely because of the abutment of the bridging/supporting plate 12 against the main supporting plate 11 of an adjacent support member 10.

As is shown in FIGS. 4-6, the main supporting plate 11 is provided with a number of cross ridges 24 so as to make it easier for products being supported by the supporting surface 7 to slide off said supporting plate in lateral direction. It is furthermore noted that the main supporting plate 11 and the bridging/supporting plate 12 are slightly concave in shape, seen in front/rear view, as is shown in FIGS. 14 and 15, which shape functions to reduce the risk of products supported by the supporting surface 7 from undesirably being moved off the supporting surface 7 in lateral direction in a neutral position of said supporting surface 7, as is shown in FIGS. 1-6. FIGS. 14 and 15 also show clearly the manner in which the height of the ridges 24 decreases in longitudinal direction from the centre towards the ends from a height of 10 mm in the centre to a height of 0 mm at the ends. The decrease in the height of the ridges 24 in the longitudinal direction thereof is also clearly shown in FIGS. 16-18, which are vertical cross-sectional views taken at various longitudinal positions of the ridges 24. The spacing between two adjacent ridges 24, seen in the direction of transport, is 30 mm. The radius for the two of the ridges 24 at the upper sides thereof as seen in the plane of drawing of FIGS. 16, 17 and 18 is 5 mm. The radius of the ridges at the upper sides thereof as seen in the plane of drawing of FIGS. 14 and 15 is approx. 3 m, and thus said radius is larger than the radius of the main supporting plate at the base of the ridges 24, on account of the decreasing the height of the ridges 24. In principle, the upper sides of the ridges could thus be completely rectilinear, seen in a direction perpendicular to the direction of transport 8, in spite of the decrease in the height of the ridges 24.

FIG. 7 is a schematic side elevation of a trolley 30 of another sorting device according to the invention, which has many points in common with the sorting device 1 as described above. The trolley 30 is movable on rails (not shown), and comprises a frame 31 with a housing 32 present thereon. At the bottom side of the housing 32, a pin 33 having a central axis 34 extends in horizontal direction, parallel to the direction of transport. A supporting body 35, which is triangular in front elevation (see FIGS. 8-13) can be tilted about the pin 33, with the central axis 34 functioning as a tilting axis. The supporting body 35 supports a supporting surface 36, which may be configured as shown in FIGS. 1-6, for example, but which may also be configured in such a manner that there is no mutual abutment of the supporting surfaces 36. The trolley 30 is also provided with a two-armed cam support 37, on the free ends of each of which arms a camming member 38 is present. The cam support 37 can be rotated about an axis of rotation 39 by driving an electric motor mounted within the housing 32. The two camming members 38 extend within two rectilinear camways 40, which include an angle of 45 degrees with each other and which extend in radial direction with respect to the central axis 34. It will also be possible to use a different angle, for example an angle ranging between 25 degrees and 65 degrees. As a shown in FIG. 8, in which the supporting surface 36 takes up a neutral position, the respective connecting lines between the camming member 38 and the axis of rotation 39 on the one hand and between the central axis 34 and the camming member 38 on the other hand extend perpendicularly to each other. This means that forces such as forces of inertia, which tend to tilt the supporting body 35 about the central axis 34, are absorbed as a result of the outer side of the camming member 38 striking against the inner side of the camway 40. Thus, the electric motor that provides the rotation of the cam support 37 is not loaded thereby in its neutral position.

Figure 8:
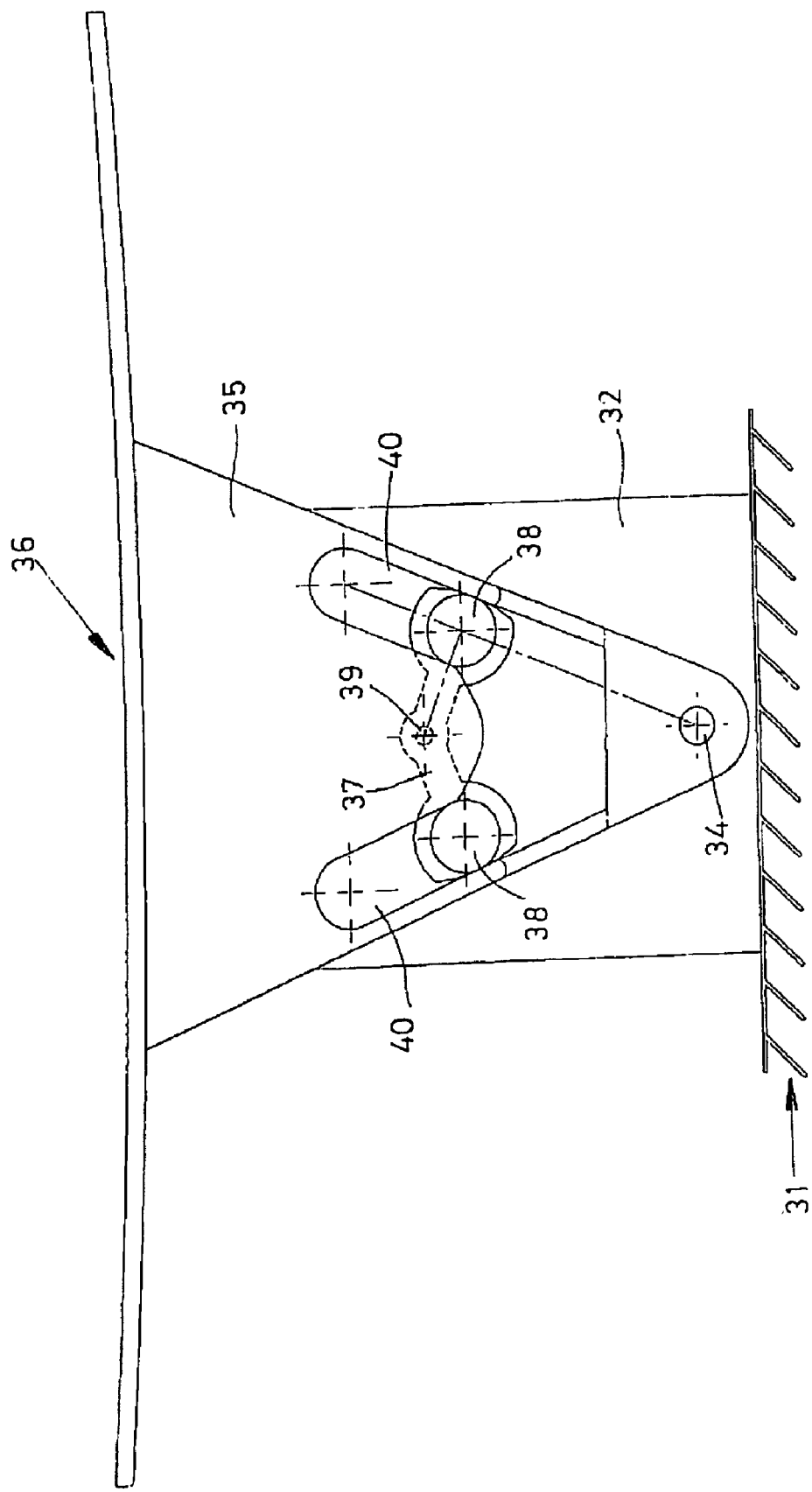
Figure 9:
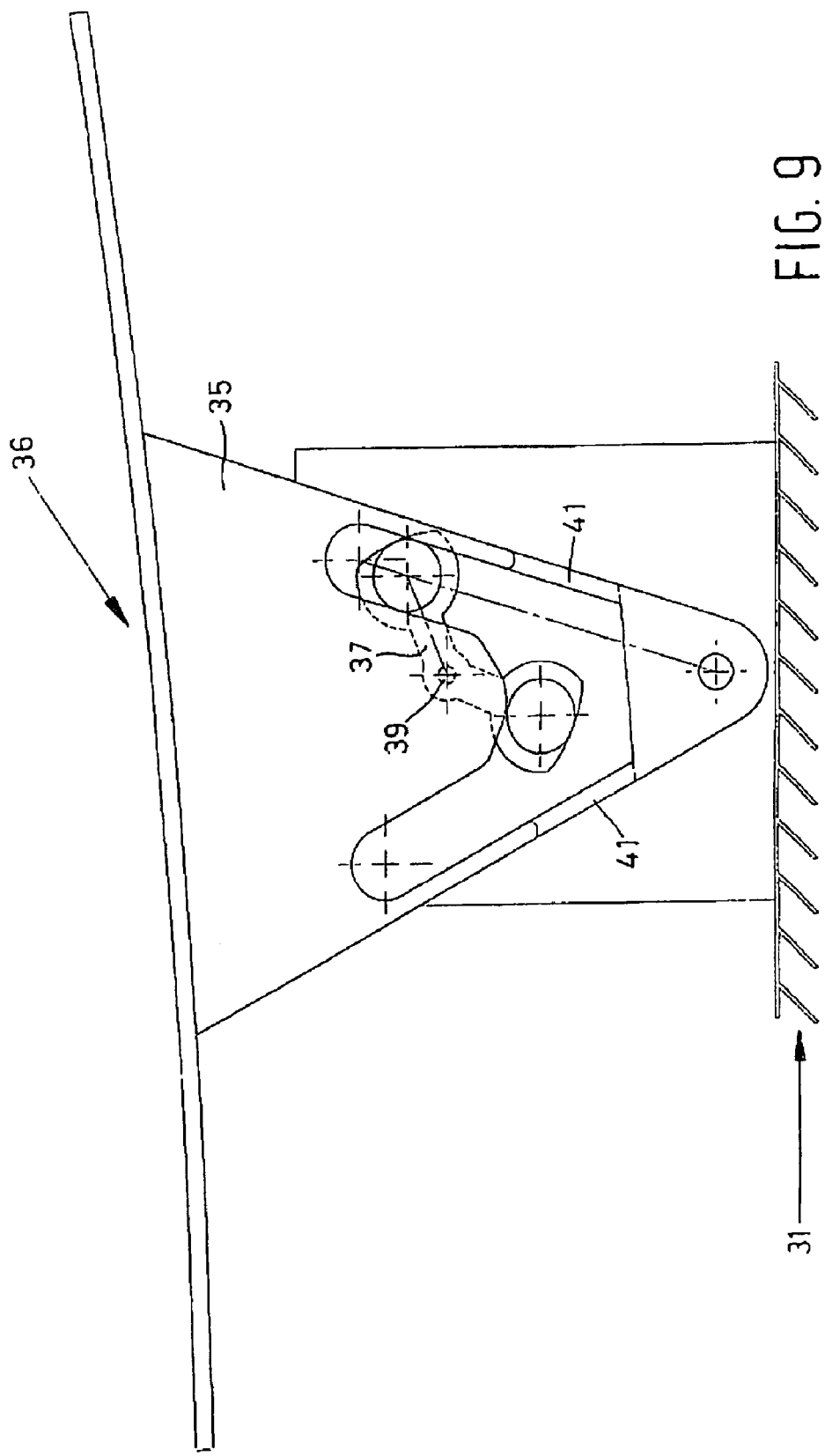
Figure 10:
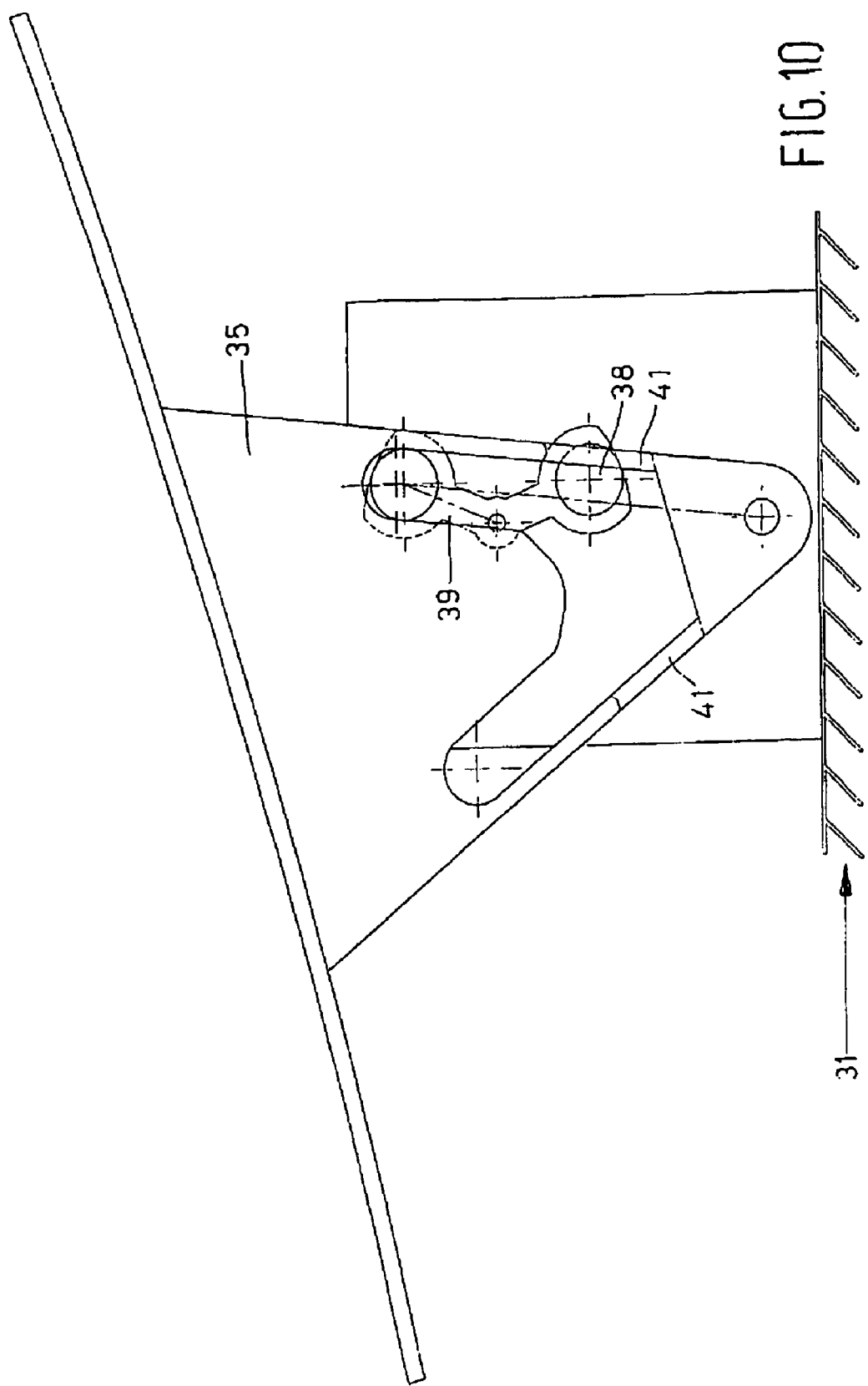

As appears from the successive FIGS. 8-13, the supporting body 35 with the supporting surface 36 will be tilted through an angle of approx. 45 degrees about the central axis 34 upon rotation of the cam support 37 with the camming members 38 about the axis of rotation 39, as a result of the mating interaction between the camming member 38 in question and the associated camway 40. A comparison between FIGS. 8 and 9 shows that a relatively large angular displacement of the cam support 37 at the start of said tilting movement results in a relatively small angular displacement of the supporting body 35. This is caused by the camway 40 extending tangentially with respect to the axis of rotation 39 at the location of the camming member 38 in the neutral position. As a result, the contribution that is required of the electric motor that provides rotation of the cam support 37 about the axis of rotation 39 at the commencement of the tilting movement is relatively small.

Figure 11:
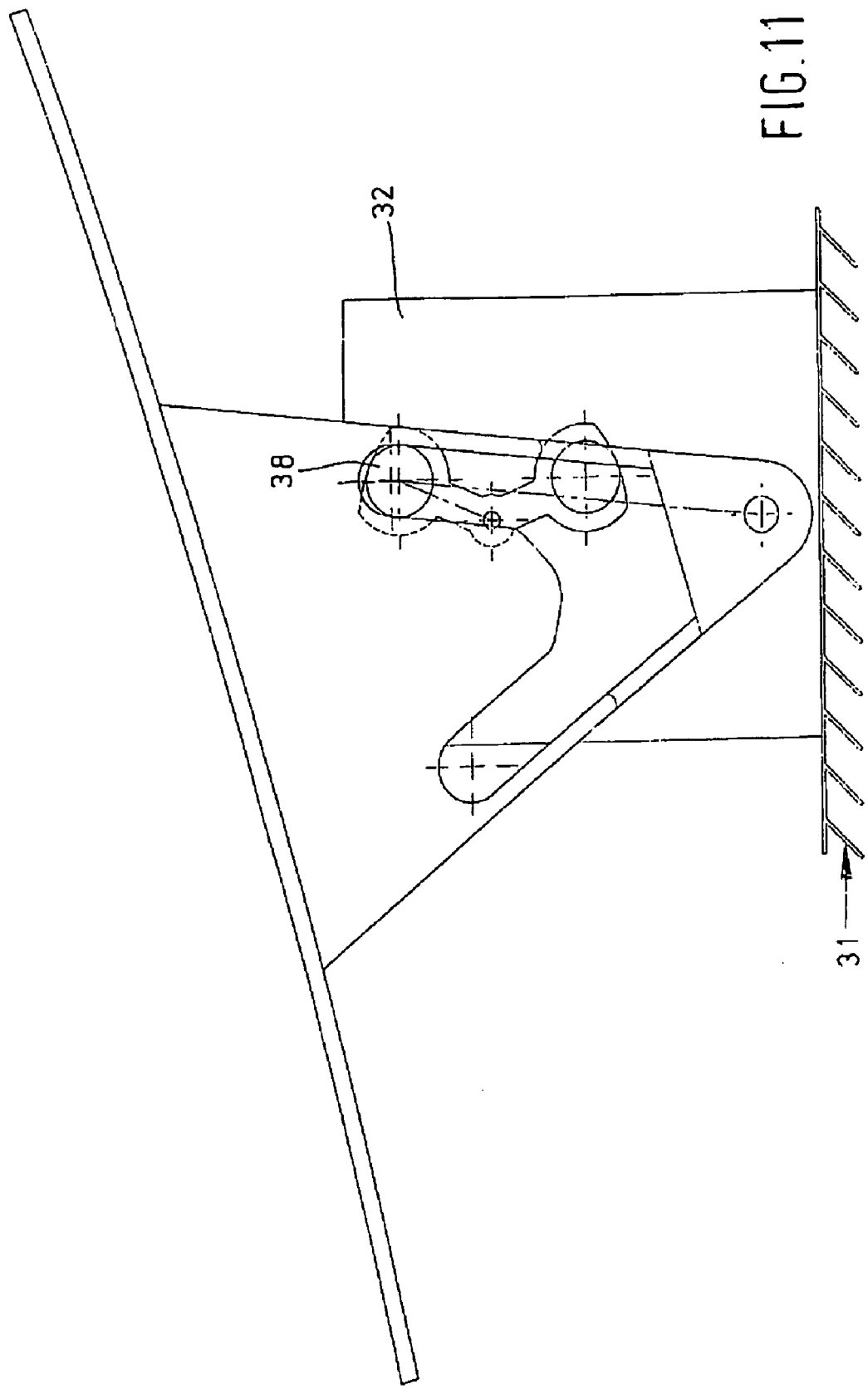
Figure 12:
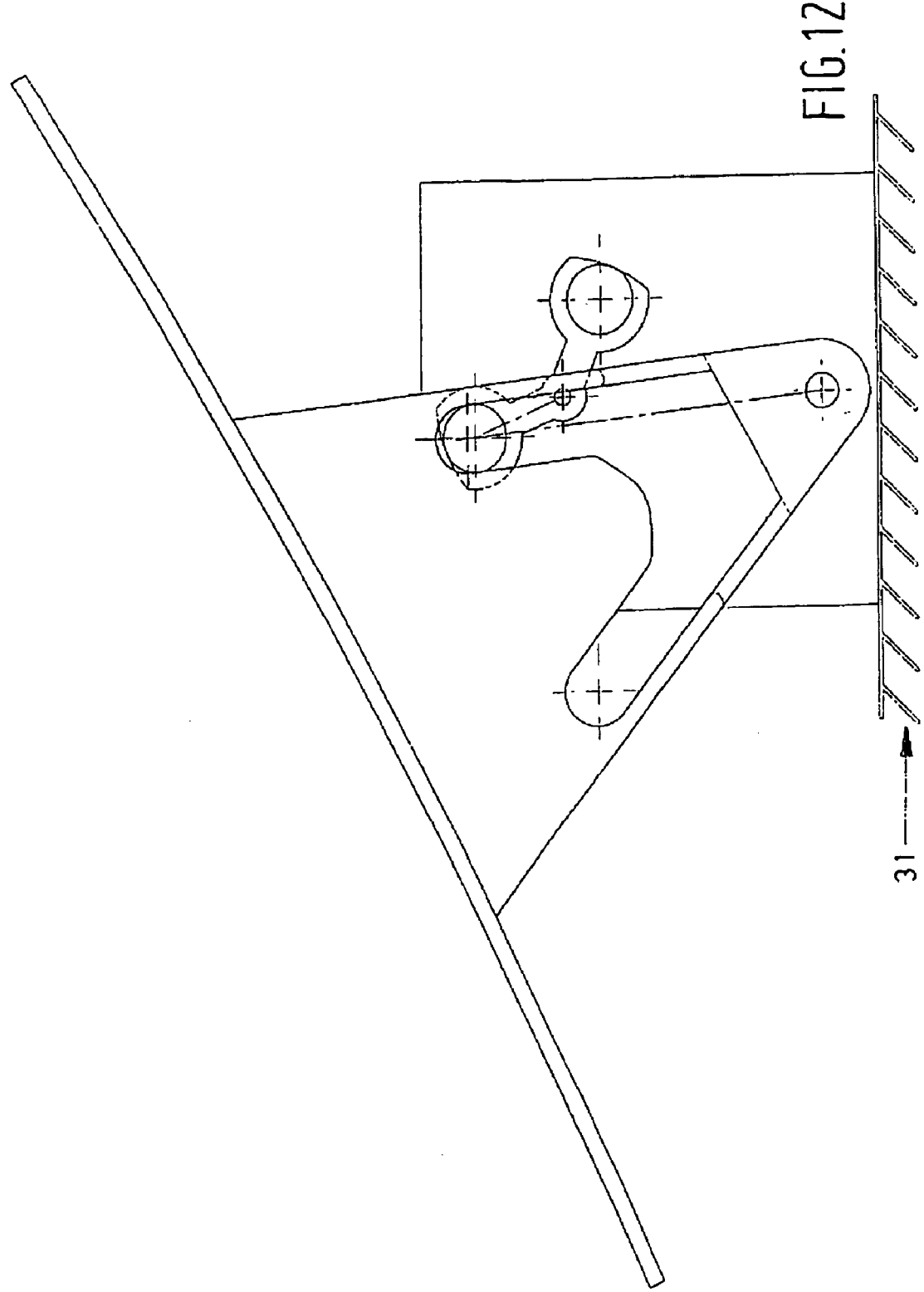

After rotation of the cam support 37 through 90 degrees (FIG. 10), the lower camming member 38, which no longer mates with the associated camway 40 at that point, moves outside the triangular circumference of the supporting body 35 to which end a passage 41 is formed in the side wall at that location. Starting approx. from the situation that is shown in FIG. 11, the camming member 38 moves down through the camway 40 again, as is also shown in FIGS. 12 and 13. FIG. 13 shows an extreme position, in which the supporting surface 36 has tilted through an angle of 45 degrees relative to the neutral position. It is important to note that the connecting lines between the axis of rotation 39 and the camming member 38 on the one hand and between the central axis 34 and the camming member 38 on the other hand extend perpendicularly to each other in said extreme position as well, so that the advantages obtained at the commencement of the tilting movement of the supporting surface 36 from the neutral position to the extreme position as described above are also obtained when the surface 36 tilts back to its original position.

It stands to reason that the cam support 37 will rotate in opposite direction during said return movement. Furthermore it stands to reason that the cam support 37 will rotate in clockwise direction about the axis of rotation 39 in order to cause the supporting surface 36 to pivot in the opposite direction, so that the other one of the camming members 38 will be operative.

FIGS. 19 and 20 schematically show a neutral position and an extreme position of means for tilting a supporting surface 36. The supporting surface 36 is supported by a supporting body 50, which is capable of tilting movement about the axis 51. The supporting body 50 is provided with a camway 52, which extends radially and (at least in the neutral position that is shown in FIG. 19) vertically relative to the axis 51. A camming member 53 extends within the camway 52, which camming member is connected to the arm 54, of which the end remote from the camming member 53 is rotatable about an axis of rotation 55. Rotation about the axis of rotation 55 may take place both to the right and to the left. Upon rotation to the right, the situation as shown in FIG. 20 is reached in an extreme position, in which position the angle between the connecting line between the axis 51 and a camming member 53 on the one hand and the connecting line between the camming member 53 and the axis of rotation 55 on the other hand is approx. 90 degrees. The advantages of this have already been explained in the foregoing.

FIGS. 21 and 22 show a third preferred embodiment of tilting means in a neutral position and in an extreme position, respectively. The third preferred embodiment is different from the second preferred embodiment as shown in FIGS. 19 and 20 as regards the shape of the camway 62. For the rest, the third preferred embodiment is substantially identical to the second preferred embodiment, and consequently the same reference numerals will be used. Changing the shape of the camway 52, 62 makes it possible on the one hand to influence the angle of tilt of the supporting surface 36 in an extreme position thereof and, on the other hand, to influence the relation between the angular position of the camming member 53 relative to the axis of rotation 55 on the one hand and the tilting position of the supporting body 50 about the central axis 51 on the other hand.

The invention claimed is:

1. A device for sorting products, comprising:
a plurality of supporting units adjacently arranged and configured to move in a direction of transport along a conveying path, each supporting unit including a conveying element configured to move along a guide extending according to said conveying path and at least one load carrying platform comprising a supporting surface for supporting a product, a support member supporting the supporting surface, and a tilting mechanism configured to tilt the supporting surface about an axis of tilt parallel to the conveying path with respect to the conveying element,
wherein the tilting mechanism comprises a drive device and at least two cams configured to be rotated by the drive device about a common axis of rotation extending parallel to the axis of tilt when one cam of the at least two cams moves within a path of a camway so as to cause the support member to tilt about the axis of tilt between a neutral position and an extreme position, and the common axis of rotation is spaced apart from said one cam by a distance, and
wherein the common axis of rotation of the at least two cams is spaced apart from the axis of tilt of the supporting surface.

2. A sorting device according to claim 1, wherein said support member comprises said camway.

3. A sorting device according to claim 1 or 2, wherein said camway extends at least substantially in radial direction with respect to the axis of tilt.

4. A sorting device according to claim 1, wherein connecting lines between the common axis of rotation and the one cam on the one hand and between the axis of tilt and the one cam on the other hand include an angle ranging between 60 degrees and 120 degrees with each other in the neutral position.

5. A sorting device according to claim 1, wherein connecting lines between the common axis of rotation and the one cam on the one hand and between the axis of tilt and the one cam on the other hand include an angle ranging between 60 degrees and 120 degrees in the extreme position.

6. A sorting device according to claim 1, wherein the tilting mechanism is configured to cause the support member to tilt between the neutral position and the extreme position through rotation through 180 degrees or more of the at least two cams about the common axis of rotation.

7. A sorting device according to claim 1, wherein the angle of tilt of the support member between the neutral position and the extreme position ranges between 30 degrees and 60 degrees.

8. A sorting device according to claim 1, wherein, during rotation on one side of the neutral position, the one of the at least two cams moves within one of two camways, and during rotation on the other side of the neutral position, the other one of said at least two cams moves within another of the two camways.

9. A sorting device according to claim 8, wherein the two camways define a V-shape.

10. A sorting device according to claim 9, wherein said V-shape comprises an angle ranging between 30 and 60 degrees.

11. A sorting device according to claim 1, wherein said drive device comprises an electric motor for each supporting surface.

12. A sorting device according to claim 1, wherein the load carrying platforms of adjacent supporting units abut against each other, each supporting surface comprising upper sides of a supporting element and of a bridging element which overlaps the supporting element at a first end thereof and which is movable in a direction parallel to the supporting surface with respect to the supporting element so as to retain mutual abutment of adjacent load carrying platforms upon passage through a curved section.

13. A sorting device according to claim 12, wherein the bridging element is movable in two degrees of freedom with respect to the supporting element.

14. A sorting device according to claim 12, further comprising spring means for causing the adjacent load carrying platforms to abut against each other.

15. A sorting device according to claim 14, wherein said spring means are operative between a pivot pin, which is operatively connected to one of the supporting element and the bridging element on the one hand and to the other one of said supporting element and said bridging element on the other hand, or at least a part of the supporting unit that is connected thereto.

16. A sorting device according to claim 1, wherein said supporting surface is provided with supporting edges extending perpendicularly to the axis of tilt.

17. A sorting device according to claim 16, wherein the height of said supporting edges decreases from a point halfway a length of said supporting edges towards the ends thereof.

18. A sorting device according to claim 17, wherein the height of the supporting edges equals zero at the ends thereof.

19. A sorting device according to claim 16, wherein the height of the supporting edges is at least 6 mm at least at a position halfway the length of said supporting edges.

20. A sorting device according to claim 16, wherein the radius of the upper sides of the supporting edges is maximally 8 mm at least at a position halfway the length of said supporting edges.

21. A sorting device according to claim 16, wherein spacing between two adjacent supporting edges is more than 10 mm and less than 80 mm.

22. A sorting device according to claim 16, wherein the radius of the upper sides of the supporting edges is maximally 6 mm at least at a position halfway the length of said supporting edges.

23. A sorting device according to claim 1, wherein the length of each supporting surface, seen in the direction of transport, ranges between 500 mm and 700 mm.

24. A sorting device according to claim 1, wherein the length of each supporting surface, seen in the direction of transport, ranges between 300 mm and 500 mm.

25. A sorting device according to claim 1, further comprising a plurality of control devices configured to simultaneously activate the tilting mechanism associated with at least two adjacent supporting units during joint support of the product by the respective supporting surfaces associated with the support units.

26. A sorting device according to claim 1, wherein connecting lines between the common axis of rotation and the one cam on the one hand and between the axis of tilt and the one cam on the other hand include an angle ranging between 80 degrees and 100 degrees with each other in the neutral position.

27. A sorting device according to claim 1, wherein connecting lines between the common axis of rotation and the one cam on the one hand and between the axis of tilt and the one cam on the other hand include an angle ranging between 80 degrees and 100 degrees in the extreme position.

28. A method for sorting products, comprising:
utilizing a device, comprising:
a plurality of supporting units adjacently arranged and configured to move in a direction of transport along a conveying path, each supporting unit including a conveying element configured to move along a guide extending according to said conveying path and at least one load carrying platform comprising a supporting surface for supporting a product, a support member supporting the supporting surface, and a tilting mechanism configured to tilt the supporting surface about an axis of tilt parallel to the conveying path with respect to the conveying element,
wherein the tilting mechanism comprises a drive device and at least two cams configured to be rotated by the drive device about a common axis of rotation extending parallel to the axis of tilt when one cam of the at least two cams moves within a path of a camway so as to cause the support member to tilt about the axis of tilt between a neutral position and an extreme position, and the common axis of rotation is spaced apart from said one cam by a distance, and wherein the common axis of rotation of the at least two cams is spaced apart from the axis of tilt of the supporting surface; and rotating the at least two cams about the common axis of rotation to tilt the supporting surface such that the products can be sorted.

29. A sorting device according to claim 16, wherein the height of the supporting edges is at least 8 mm at least at a position halfway the length of said supporting edges.

30. A device for sorting products, comprising:

a plurality of supporting units adjacently arranged and configured to move in a direction of transport along a conveying path, each supporting unit including a conveying element configured to move along a guide extending according to said conveying path and at least one load carrying platform comprising a supporting surface for supporting a product, a support member supporting the supporting surface, and a tilting mechanism configured to tilt the supporting surface about an axis of tilt parallel to the conveying path with respect to the conveying element, wherein the tilting mechanism comprises a drive device and at least two cams configured to be rotated by the drive device about a common axis of rotation extending parallel to the axis of tilt when one cam of the at least two cams moves over a camway so as to cause the support member to tilt about the axis of tilt between a neutral position and an extreme position, and the common axis of rotation is spaced apart from said one cam by a distance, and wherein connecting lines between the common axis of rotation and the one cam on the one hand and between the axis of tilt and the one cam on the other hand include an angle ranging between 60 degrees and 120 degrees with each other in the neutral position or in the extreme position.

31. A device for sorting products, comprising:

a plurality of supporting units adjacently arranged and configured to move in a direction of transport along a conveying path, each supporting unit including a conveying element configured to move along a guide extending according to said conveying path and at least one load carrying platform comprising a supporting surface for supporting a product, a support member supporting the supporting surface, and a tilting mechanism configured to tilt the supporting surface about an axis of tilt parallel to the conveying path with respect to the conveying element, wherein the tilting mechanism comprises a drive device and at least one cam configured to be rotated by the drive device about an axis of rotation extending parallel to the axis of tilt when the cam moves over a camway so as to cause the support member to tilt about the axis of tilt between a neutral position and an extreme position, and the axis of rotation is spaced apart from said cam by a distance, and wherein the tilting mechanism is configured to cause the support member to tilt between the neutral position and the extreme position through rotation through 180 degrees or more of the cam about the axis of rotation.

32. A device for sorting products, comprising:

a plurality of supporting units adjacently arranged and configured to move in a direction of transport along a conveying path, each supporting unit including a conveying element configured to move along a guide extending according to said conveying path and at least one load carrying platform comprising a supporting surface for supporting a product, a support member supporting the supporting surface, and a tilting mechanism configured to tilt the supporting surface about an axis of tilt parallel to the conveying path with respect to the conveying element, wherein the tilting mechanism comprises a drive device and at least one cam configured to be rotated by the drive device about an axis of rotation extending parallel to the axis of tilt when the cam moves over a camway so as to cause the support member to tilt about the axis of tilt between a neutral position and an extreme position, and the axis of rotation is spaced apart from said cam by a distance, wherein the load carrying platforms of adjacent supporting units abut against each other, each supporting surface comprising upper sides of a supporting element and of a bridging element which overlaps the supporting element at a first end thereof and which is movable in a direction parallel to the supporting surface with respect to the supporting element so as to retain mutual abutment of adjacent load carrying platforms upon passage through a curved section, and further comprising spring means for causing the adjacent load carrying platforms to abut against each other.

* * * * *